US007668386B2

(12) United States Patent
Beatty

(10) Patent No.: US 7,668,386 B2
(45) Date of Patent: Feb. 23, 2010

(54) LOSSLESS COMPRESSION ALGORITHMS FOR SPATIAL DATA

(75) Inventor: Bryan K Beatty, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 612 days.

(21) Appl. No.: 11/090,680

(22) Filed: Mar. 25, 2005

(65) Prior Publication Data

US 2006/0215923 A1    Sep. 28, 2006

(51) Int. Cl.
 G06K 9/48    (2006.01)
(52) U.S. Cl. ........................... 382/242; 382/197
(58) Field of Classification Search ................ 382/197, 382/242; 708/525
 See application file for complete search history.

(56) References Cited

U.S. PATENT DOCUMENTS 4,777,651 A * 10/1988 McCann et al. ............. 382/242
5,519,618 A * 5/1996 Kastner et al. .............. 701/120
6,477,280 B1   11/2002 Malvar
6,912,319 B1 * 6/2005 Barnes et al. ............... 382/240
7,418,145 B2 * 8/2008 Sugita ....................... 382/243

* cited by examiner

Primary Examiner—Bhavesh M Mehta
Assistant Examiner—Dennis Rosario
(74) Attorney, Agent, or Firm—Merchant & Gould

(57) ABSTRACT

The present invention is related to routines for the processing of quantized vector data into one or more arrays of integers whose values are closer to zero than the integers in the quantized vector data. The arrays are input to a compression engine resulting in compressed bytes of data that may be transferred to a computing device for the decompression of the data. The quantized vector data can include vertices expressed as a pair of integer values that may represent geometric, spatial elements, such as points, interconnected lines (polylines), and polygons. These geometric objects may be representative of information on a map. The compressed bytes may be grouped according to grids, wherein each grid represents a distinct geographic area of a map, so that a consumer can store and decompress only the portion of the map data which is of interest.

20 Claims, 16 Drawing Sheets

| CONNECTIVITY GRAPH | | |
|---|---|---|
| X,Y | START | END |
| 525,698 | PRIMITIVE 1 | |
| 578,629 | PRIMITIVE 2<br>PRIMITIVE 4 | PRIMITIVE 1 |
| 634,578 | PRIMITIVE 3<br>PRIMITIVE 5<br>PRIMITIVE 6 | PRIMITIVE 2 |
| 681,498 | | PRIMITIVE 3 |

LOSSLESS COMPRESSION ALGORITHMS FOR SPATIAL DATA

FIELD OF THE INVENTION

The present invention is related to methods for the conversion of quantized vector data into arrays of integers whose values are closer to zero than the quantized vector data integers, will require less storage space, and are suitable as input to a compression engine.

BACKGROUND OF THE INVENTION

With the miniaturization of computing devices, it has become increasingly more important to maximize the use of computing device storage capabilities. Data compression refers to reducing the amount of space or bandwidth needed to store or transmit a block of data used in communications, facsimile transmissions, file storage and file transfer. Consumer computing devices, such as phones incorporating a display, are increasing in popularity. With a receiver and a display, data representing any geographical location can be transmitted and displayed in a visual format. For example, it has become increasingly popular to provide maps displaying streets and highways, points of interest, such as restaurants, over a communication network for downloading onto a cellular phone or other computing device. As many consumers now carry cell phones virtually all the time, a map displaying such information can prove very useful. However, map objects such as roads, rivers, lakes, political divisions, points of interest, etc., require a large volume of data. Because of the limited storage capability of many consumer computing devices, the technique of compressing the data (both in terms of computation and in terms of degree of compression) should be very efficient. In conventional data compression algorithms, the entire data file (for example, data representing the entire continental United States) is provided as a single monolithic block of data, which cannot be edited or updated. The data being in a single monolithic block limits its usefulness.

In general, there are two kinds of compression: "lossy" and "lossless." Lossy compression means that some data fidelity is lost when compressing, generally, for the purpose of boosting compression ratios. Lossless compression does not lose any fidelity, but is harder to achieve good compression ratios.

Given the limited storage space of computing devices, it would be desirable to develop a set of compression algorithms that achieve comparable compression ratios as conventional compression algorithms, but wherein the data can be modular, so that a user may be provided only with the data, which is on interest, rather than the entire block of data, much of which may be irrelevant and which only takes up storage space. The present invention achieves this objective and has further related advantages.

SUMMARY OF THE INVENTION

The present invention is related to routines for the processing of quantized vector data into one or more arrays of integers whose values are closer to zero than the integers in the quantized vector data. The arrays are input to a compression engine, which results in compressed bytes requiring less storage. The quantized vector data can include vertices expressed as a pair of integer values that may represent geometric, spatial objects, such as points, interconnected lines (polylines), and polygons. These geometric objects may be representative of information on a map. The compressed bytes produced in accordance with the invention may be distributed over a communication network to a plurality of computing devices. Alternatively, the compressed bytes may be stored on a mass storage device, and transferred to computing devices by downloading from the storage device.

One embodiment of the invention is related to a method for compressing quantized vector data into compressed bytes. The method includes obtaining a body of quantized vector data comprising first integers. The method includes converting a portion of the quantized vector data into one or more arrays of second integers, wherein at least some of the second integers are closer to zero than the first integers. The arrays are provided to a compression engine, and the arrays of second integers are compressed into compressed bytes. The compressed bytes may be transferred and decompressed independently of the remaining body of data in order to produce spatial information from just a portion of the data.

In one embodiment, the body of quantized vector data can be apportioned to a plurality of grids, each grid representing a specific geographic area. For example, the plurality of grids may represent the map of the entire continental United States, or other large geographic area. The method includes converting at least the portion of the quantized vector data specific to one grid into one or more arrays of second integers, wherein at least some of the second integers are closer to zero than the integers that are in the quantized vector data. The method includes inputting the arrays of second integers to a compression engine, and compressing the arrays of second integers into compressed bytes, wherein the compressed bytes can be individually transferred and decompressed for each grid.

One embodiment of the invention is related to a method, and to a computer readable medium containing the method for decompressing compressed bytes into vector data. The method includes obtaining compressed bytes, wherein the compressed bytes may be decompressed independently of a related body of compressed data to produce spatial information from just a portion of the compressed data. The method includes decompressing the compressed bytes into arrays of first integers. The method includes converting the arrays of first integers into quantized vector data comprising second integers, wherein at least some of the first integers are closer to zero than the second integers.

In one embodiment, the compressed bytes that are obtained are specific to one grid from a plurality of available grids; wherein each grid may represent a discrete geographic location, and the entirety of the grids may represent a much larger geographic area. The method includes decompressing the compressed bytes into arrays of first integers. The method includes converting the arrays of first integers into quantized vector data having second integers, wherein at least some of the first integers are closer to zero than the second integers. The method includes dequantizing the quantized vector data into vector data that may be displayed on a computing device's display.

In one embodiment, a method for compressing quantized vector data into compressed bytes of data, is provided. The method includes obtaining quantized vector data comprising first integers; generating a first polyline from at least some of the quantized vector data; generating any polylines that branch from the first polyline from at least some of the quantized vector data; storing the interconnecting polylines as one or more arrays of second integers, wherein at least some of the second integers are closer to zero than the first integers; and compressing the arrays of second integers into compressed bytes. Polylines are a collection of vertices connected by line segments. A first polyline is stored by, storing the true integer values of its starting vertex, storing the simple deltas to the next vertex, and the remaining vertices are stored as predictive deltas. Once a chain of polylines is completed, any interconnected polylines, making up further child chains are stored by, storing the simple deltas to the first vertex, and the remaining vertices are stored as predictive deltas for each branch.

In one embodiment, a method for decompressing compressed bytes of data into quantized vector data, is provided. The method includes obtaining compressed bytes; decompressing the compressed bytes into one or more arrays of first integers; generating a first polyline from at least one array of first integers; generating any polylines that branch from the first polyline from at least one array of first integers; expressing any polylines as quantized vector data comprising second integers, wherein at least some of the first integers are closer to zero than the second integers. Polylines are a collection of vertices connected by line segments. A first polyline is expressed and can be stored by, storing the true integer values of its starting vertex, storing the simple deltas to the next vertex, and the remaining vertices are stored as predictive deltas. Once a chain of polylines is completed, any interconnected polylines, making up further child chains, are stored by, storing the simple deltas to the first vertex, and the remaining vertices are stored as predictive deltas for each branch.

The methods in accordance with the invention, when executed within a computing device environment, may be saved or stored to any computer-readable medium to carry out either a data compression routine or a data decompression routine. The decompression and compression routines in accordance with the invention include using at least one or more of the geometric algorithms described herein. Such geometric algorithms include what are referred to herein as predictive delta compression, hash point compression, chaining compression, and indexing compression. The geometric compression algorithms according to the invention are lossless, meaning that after compression of quantized vector data and decompression of the results will reproduce the original quantized vector data without loss of fidelity.

Compressing and decompressing data in accordance with the invention makes possible the installation of discrete portions of a much larger map onto a computing device. The present invention further makes it possible to download one or more individual regions onto a computing device, such as a mobile, cellular phone, and to manage specific map content to fit the storage space that is available according to the computing device. The present invention also makes it possible to obtain map updates over a communication network, in which only the needed pieces of data are transmitted rather than perform a complete data replacement.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
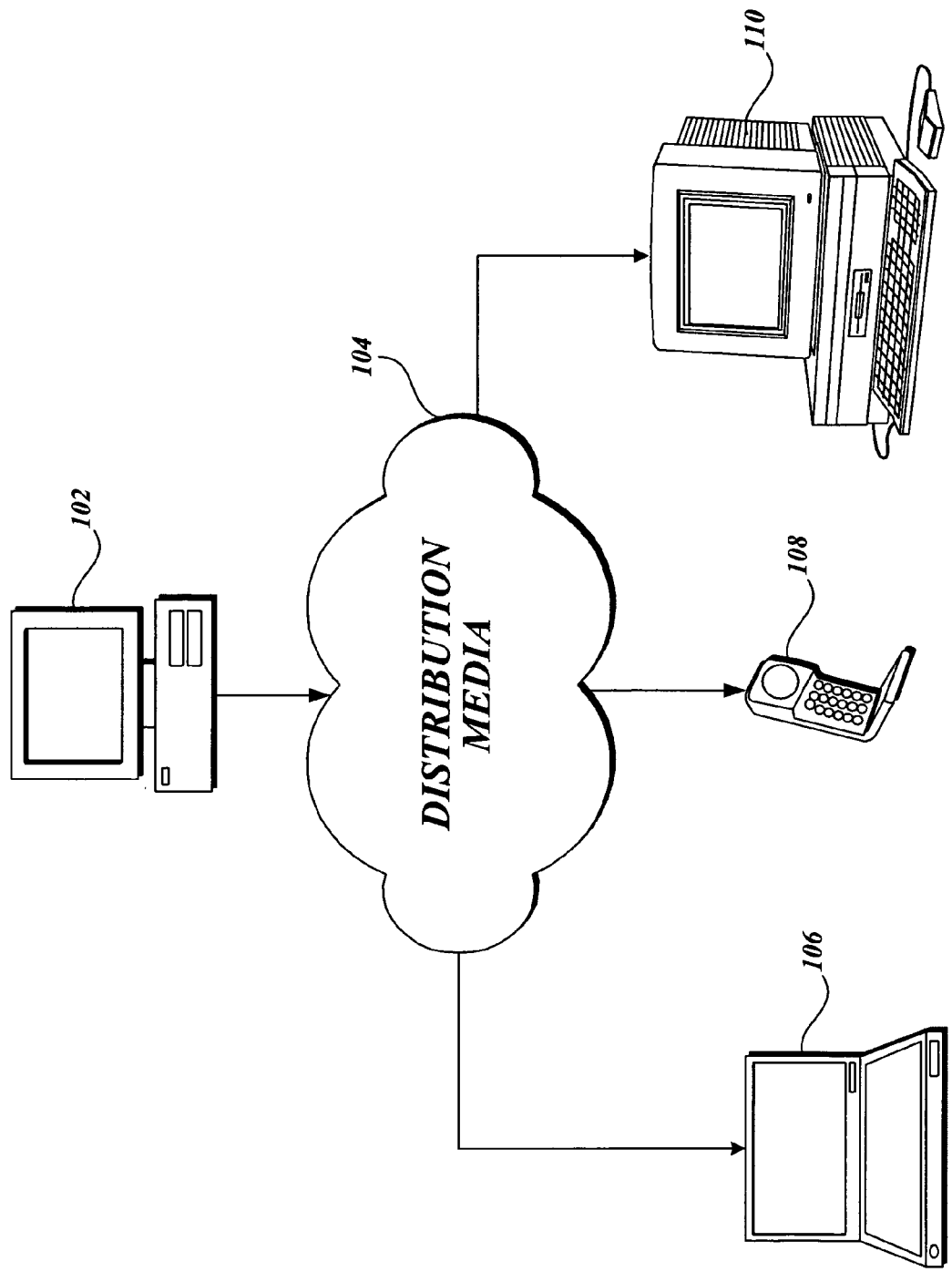
FIG. 1 is a pictorial diagram of a representative environment for utilizing the compression algorithms according to the present invention.

The present invention is related to methods of processing quantized vector data into arrays of integers, requiring less storage than the quantized vector data, and whose integer values are closer to zero than the quantized vector data. Quantized vector data includes "vertices" or points in space expressed as true integer values. The quantized vector data is processed in accordance with the invention to convey the same information as the quantized vector data, only requiring less storage. The present invention accomplishes this by expressing the vertices in integers closer to zero than the integers of the quantized vector data. In the methods according to the invention, quantized vector data is output as arrays of integers, whose values will tend to be small in comparison to the integer values of the quantized vector data. Lower integer values means less storage space is required, due to the nature of the compression engine applied to the output. Additionally, the methods in accordance with the invention may eliminate redundant data to further minimize the amount of storage required. The methods in accordance with the present invention are particularly suited for quantized vector data of spatial elements, such as points, polylines, and polygons, which are often used to represent features on a map. The arrays of integers produced in accordance with the invention can then be input to a compression engine that will result in compressed bytes of data at very favorable compression ratios. Furthermore, the methods in accordance with the invention result in modular compressed bytes of data, that may be individually transferred to and decompressed by consumer computing devices, rather than having to transfer and decompress one monolithic body of data. For example, compressed data representing one city (or even just a few city blocks) may be transferred and decompressed, as opposed to transferring and decompressing data for the entire map of the United States.

Some compression engines have the characteristic that small integer values can be compressed very effectively to a small amount of bytes. A suitable compression engine for use in the present invention is described in the commonly assigned U.S. Pat. No. 6,477,280, expressly incorporated herein by reference. A person skilled in the art will, however, appreciate that there can be other compression engines suitable for use with the methods in accordance with the present invention. Accordingly, the compression engine suitable for use in the present methods is not limited to those disclosed in the '280 patent. It should be readily appreciated that the compression engines disclosed in the '280 patent are merely exemplary compression engines that may be used with the methods described herein. Characteristics of preferred, compression engines include: compression engines whose input is an array of signed integers, wherein the output is an array of compressed bytes, and wherein the compression engine generates the smallest compressed output when the input integers are consistently small and tend to have values close to or tending to zero.

The present invention can be used with spatial data. Spatial data can include, but is not limited to points, polylines, and polygons, which may be used to represent features on a map, including locations of points of interest, roads, hydrology features, and political divisions. While the present invention may be discussed in the context of a map and map features, the use is for illustration purposes and should not be construed as limiting of the invention. The present invention may be applied to any set of points in 2-dimensional space. The discussion of a map and map features is merely to illustrate one embodiment of the present invention.

The following terms used throughout the application are given the following definitions, unless otherwise indicated.

DEFINITIONS

"Build-time" refers to processes that happen when the data that is to be compressed is "built." As is known to those skilled in the art, a data provider can obtain raw data, such as data for maps expressed as latitude and longitude, and convert the raw data into more "efficient" data that can be transmitted efficiently (requiring lower bandwidth) and processed more rapidly at the consumer end, as compared with the raw data. The overall process at the consumer end is optimized to make retrieving and using the data as fast as possible. Writing the data at build-time can be slow. However, a data provider can utilize relatively large computers with greater processing and storage capabilities, compared with a consumer who has to receive the compressed data and decompress the data. An example of build-time operations would be a process that happens once per product release cycle, when producing a set of data files for commercial release.

"Run-time" refers to processes that occur at the time the data is used. An example of run-time operations would be accessing a local store of data on a Web server every time a remote client makes a Web request. Another example would be accessing data to display a map every time an end-user runs a mapping application on a mobile device.

"Vertex" refers to a two-dimensional point, represented by X and Y coordinates. The numeric format of the coordinates is not germane to the present invention, but will typically be a floating-point number, such as a latitude and longitude.

"Primitive" refers to a geometric object made up of vertices. There are three types of primitives described herein. A point has a single vertex. A line (also called a polyline) has two or more ordered vertices, with consecutive vertices connected by line segments. A polygon represents an area. A polygon has either zero vertices (meaning "infinite in extent"), or three or more vertices connected by line segments to define an area.

"Vector data" refers to structured numeric data describing geometric primitives (points, lines, polygons) that are used for some applications, such as showing objects on a map.

"Quantized vertex" refers to a special form of a vertex that uses integers for its X and Y values.

"Quantized vector data" is a set of vector data comprised of quantized vertices.

"Quantization" refers to a mathematical process of converting vector data to quantized vector data.

"Compression" is the process of converting quantized vector data into an ordered set of bytes, with the objective being for the number of bytes to be as small as possible.

"Compressed bytes" refers to compressed data that may be stored and transported.

"Distribution" refers to the process of transporting the compressed bytes from the build-time environment to the run-time environment. Examples of distribution may include, but are not limited to, downloading map content from a Web site, storing map data on a CD for sale as a boxed software product, putting the data on a Web server, wireless transmission, and the like.

"Decompression" is the process of converting compressed bytes into quantized vector data, followed by conversion to vector data that may be visually displayed. Decompression is generally the inverse of compression.

Compression and Decompression

Referring to FIG. 1, an environment in which the methods in accordance with the present invention may be used, is illustrated.

Computer 102 is used to process the raw vector data, which may be expressed as latitude and longitude coordinates. Computer 102 operates the build-time processes. Build-time processes include obtaining vector data, such as points, lines, and polygons and quantizing the vector data into quantized vector data. The quantized vector data is compressed, first by using a method in accordance with the present invention to convert quantized vector data into arrays having integers whose values are closer to zero than the quantized vector data. The arrays produced by the methods in accordance with the invention are input to a compression engine that is also stored on the computer 102. The compression engine output provides the compressed bytes, which may be distributed over anyone from a number of distribution media 104. Each of the distribution media can be used to transport the compressed bytes from the build-time environment to the run-time environment. Furthermore, due to the modular nature of the data that is produced in accordance with the invention, it is possible to transport less than all available compressed data. This is advantageous, for example, when downloading the data to a device having limited storage and processing capability. In one embodiment, the distribution medium is a communication network. The communication network can include any internal intranet, or external communication networks, such as but not limited to local area networks, wide area networks, and the TCP/IP communication network, commonly referred to as the Internet. In another embodiment, the distribution medium 104 can be a mass storage device, such as a compact disk (CD). A CD is typical of many software products that can be purchased and downloaded to a user's personal computer. In yet another embodiment, the distribution medium 104 can be a computer system, wherein the compressed data is stored on a first computer system and the compressed data is transported via a universal serial bus (USB) to a second, local computer system, such as downloading part of the compressed data from a personal computer to a smaller cellular phone. It should be understood that the mention of any one distribution medium is for the purpose of illustrating the invention, and should not be construed as limiting of the invention. The compressed bytes of data can be distributed to various computing devices. For example, computing devices include but are not limited to personal computers 110, cellular mobile phones 108, laptops 106, and the like. Each one of the computing devices 106, 108 and 110 may include a computer processor, storage, and a computer readable medium containing instructions to carry out the run-time processes. During run-time, the compressed bytes obtained over the communication network 104 are decompressed by utilizing, generally in a reverse order, one or more of the methods in accordance with the invention, resulting in quantized vector data. The quantized vector data is dequantized to vector data, which may be displayed on the computing devices' displays as points, lines, or polygons to represent map features.

By way of example, and not limitation, computer readable media may comprise computer storage media and communication media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory, or other memory technology, CD-ROM, digital versatile disks (digital videodisc) (DVD) or other optical storage, magnetic cassettes, magnetic tape, magnetic disk storage or other magnetic storage devices, or any other medium which can be used to store the desired information. Communication media typically embodies computer readable instructions, data structures, program modules, or other data in a modulated data signal such as a carrier wave or other transport mechanism and includes any information delivery media. By way of example, and not limitation, communication media includes wired media such as wired network or direct-wired connection, and wireless media such as acoustic, RF, infrared and other wireless media.

Figure 2:
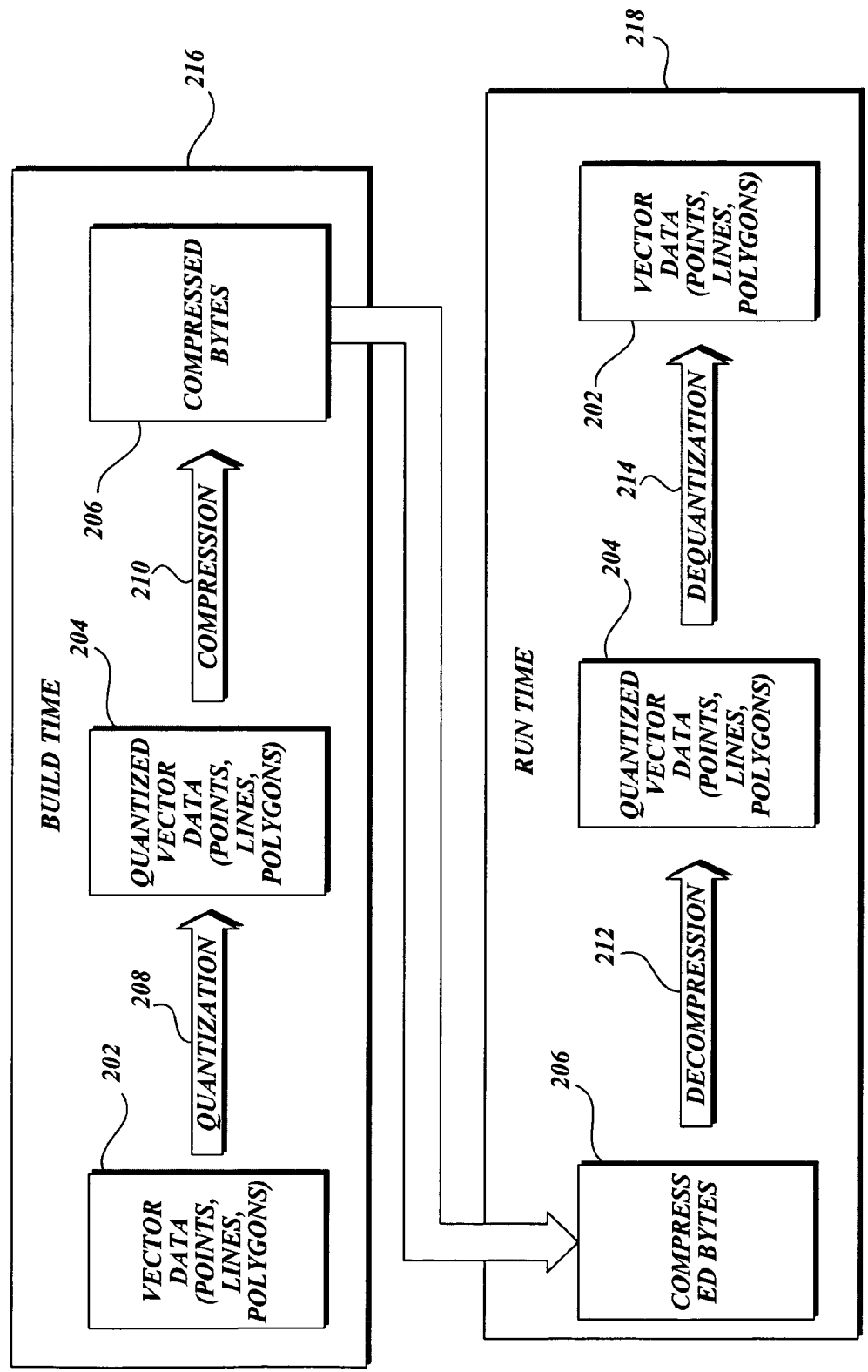
FIG. 2 is a flow diagram of a representative build-time process and run-time process according to the present invention.

Referring to FIG. 2, a more detailed illustration of the build-time process 216 and the run-time process 218, is provided. The build-time process 216 includes obtaining vector data 202, such as points, lines, and polygons, applying a quantization process 208 to the vector data 202. The quantization process 208 results in quantized vector data 204, which is representative of the same points, lines, and polygons as the vector data 202, a difference being that the quantized vector data 204 expresses the points, lines, and polygons as true integers, as opposed to floating point values that may appear in the vector data 202. A compression process 210 is applied to the quantized vector data 204. The compression process 210 includes as a process component one or more of the methods in accordance with the invention to output quantized vector data 204 as compressed bytes 206. Compressed bytes of data 206 can be stored, transmitted, transported, or in any other manner conveyed to a device capable of operating the run-time process 218.

The run-time process 218 includes obtaining the compressed bytes 206, generated by the build-time process 216. A decompression process 212 is applied to the compressed bytes 206. The decompression process 212 is, in essence, the same operations applied during the compression process 210, only in reverse order. The decompression process 212 takes compressed bytes 206 and outputs quantized vector data 204, generally similar to the quantized vector data during the build-time process 216. A dequantization process 214 is applied to the quantized vector data 204 and output as vector data 202, generally similar to the vector data 202, which was quantized during the build-time process 216. Vector data 202 from the run-time process 218 may now be displayed in any suitable manner to convey the desired information.

Figure 3:
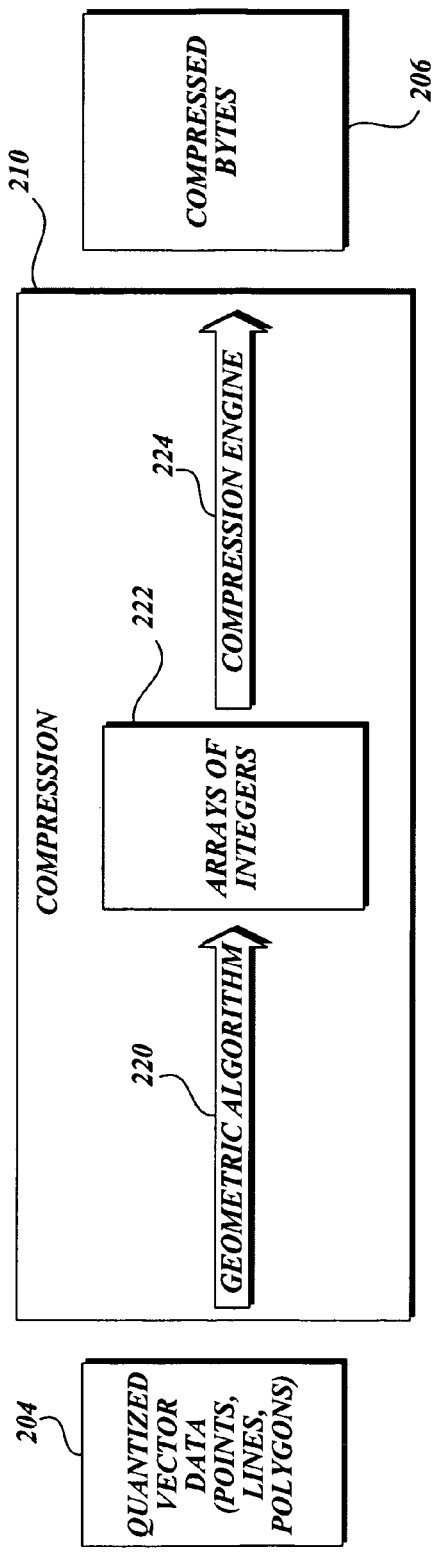
FIG. 3 is a flow diagram of the compression of data according to the present invention.

Referring to FIG. 3, a more detailed illustration of the compression process 210 is provided. Quantized vector data 204 is the input to the compression process 210. In the compression process, one or more geometric algorithms 220 in accordance with the present invention can be applied to the quantized vector data 204 to provide arrays of integers 222, requiring less storage than the quantized vector data 204, yet arrays of integers 222 represent or convey the same information as quantized vector data 204, however, the integer values of arrays 222 tend to be lower or closer to zero than the quantized vector data integer values 204. If the quantized vector data 204 is known to be expressed as any one of points, lines, or polygons, then the geometric algorithm 220 can be selected according to the geometric algorithm which is the most suitable for either points, lines, or polygons. Otherwise, all quantized vector data 204 can be subjected to all embodiments of geometric algorithms 220, output as arrays of integers 222, compressed, and a comparison of the results can be made to determine which geometric algorithm resulted in the most favorable compression, and that geometric algorithm can be selected as the one to be used for decompression. A flag or marker may be transmitted with the compressed bytes of data to indicate which one of the geometric algorithms to apply at decompression. Regardless of the computation method used to arrive at the arrays of integers 222, the arrays of integers produced in accordance with the present invention are input to a compression engine 224, which has been described above. Compression engine 224 processes the arrays of integers 222 and outputs compressed bytes 206. As described above, compressed bytes 206 may be communicated in any manner to a computing device capable of operating the run-time process.

Figure 4:
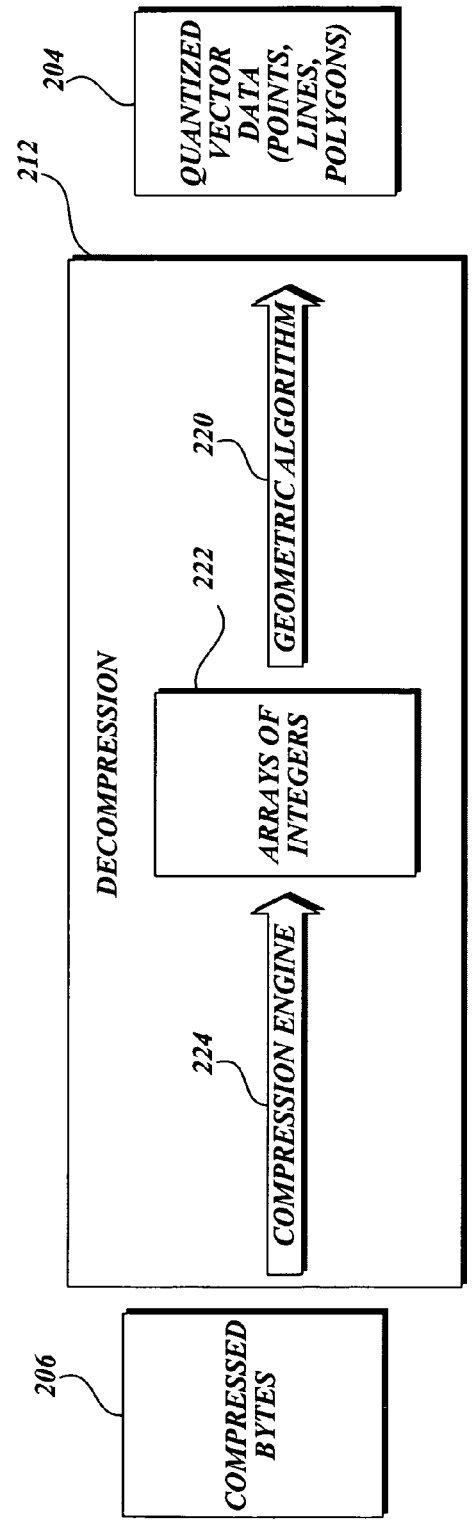
FIG. 4 is a flow diagram of the decompression of data according to the present invention.

Referring to FIG. 4, the compressed bytes 206 output from compression engine 224 are input to a decompression process 212 operating in a computing device environment. A compression engine 224 configured to output arrays of integers 222 is applied to the compressed bytes 206. The marker, indicating the most favorable geometric algorithm to apply, can be read, and the geometric algorithm selected accordingly. Geometric algorithm 220 used in decompression 212 may be the same geometric algorithm 220 used during compression 210, however, applied in a reverse order to convert the arrays of integers 222 into the quantized vector data 204. Quantized vector data 204 may be dequantized into vector data, which may be processed into a suitable format for viewing.

Quantized Vector Data and Grids

Vector data may be used to represent map features. For example, every feature on a map can be represented by an X, Y pair of coordinates that are the feature's latitude and longitude. However, since the earth is divided only into 360 degrees of latitude and 360 degrees of longitude, expressing a location on the surface of the earth by latitude and longitude that will be precise enough to within several feet will require the use of floating point values. Generally, up to seven decimal places will be required, which can take up to 8 bytes of storage (64 bits). Therefore, each vertex or point on the earth's surface will require 16 bytes, or 128 bits. While still a viable method of storing data, working with floating point values is expensive in terms of both computer storage and computer processing. Thus, the latitude/longitude system is not efficient when dealing with large volumes of data. Accordingly, an alternate method needs to be implemented. Quantized vector data that is expressed as integer values as opposed to floating point values can be used to represent points in space.

Figure 5:
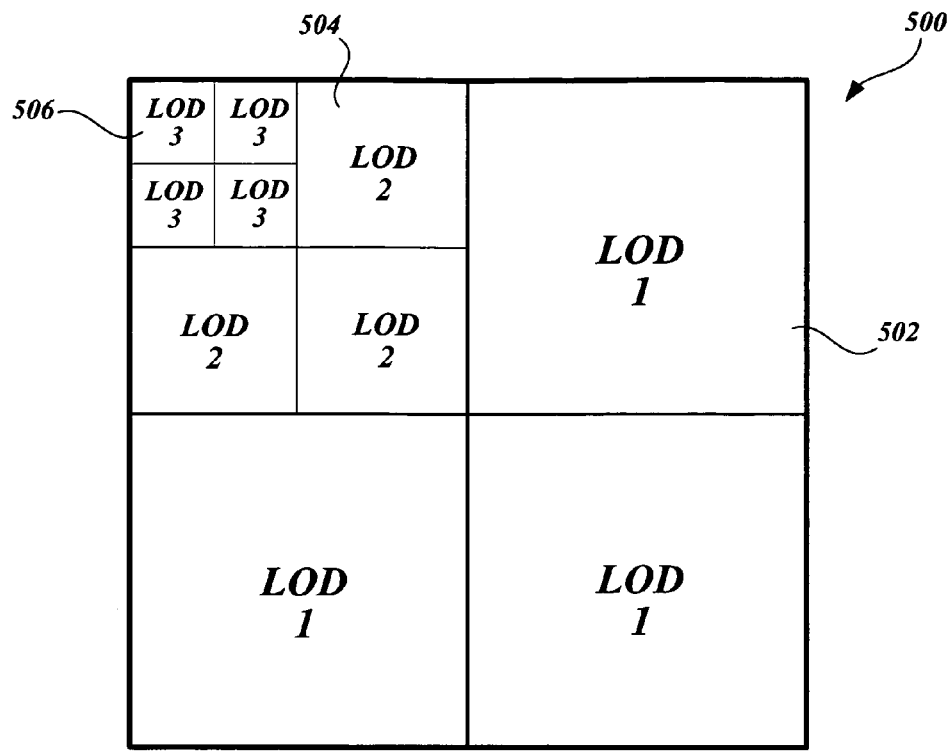
FIG. 5 is a diagram of a representative grid system according to the present invention.

One example of obtaining quantized vector data from latitude and longitude coordinates can be illustrated by dividing the earth into grids, as shown in FIG. 5. As used herein, a "grid" is a spatially contiguous region in space that represents a spatial subset of the total available data. The mention of grids when referring to the earth's surface is merely for illustration purposes and should not be construed to limit grid merely to represent the earth's surface. In one example, the earth's surface can be divided into successively smaller and smaller grids at a fixed reduction ratio, so that every reduction in the area covered by a grid quadruples the resolution. Each successive increase in resolution is assigned a higher level of detail (LOD). Each grid at LOD 1 (502) is subdivided into four child grids at LOD 2 (504), each grid at LOD 2 is divided into four more grids at LOD 3 (506), and so forth, as shown in FIG. 5. If a grid is divided into a sufficient number of divisions, then at the very highest detail, one grid can represent a small surface of the earth with sufficient resolution to locate objects accurately to within several feet.

As an example, a grid at the highest LOD can be divided into 16,384 units both horizontally and vertically. If the grid corresponds to a 10-kilometer square of the earth's surface, then every division of the grid is approximately 2 feet, which will be accurate enough for locating most features on maps that are of interest to consumers. To quantize latitude and longitude coordinates from floating point values into integers, each pair of X, Y coordinates in latitude and longitude can be plotted on the grid and assigned a new quantized X, Y pair in integers having the value between 0 and 16,383 that is the intersection of the two lines nearest to the latitude and longitude position. Also, the largest integer possible to represent any location on the grid in the example is 16,383, which can be expressed in binary code having only 14 bits (quantization bits). Therefore, in the example, any quantized X, Y pair of coordinates will have a maximum 28 bits that may represent any location on the earth with sufficient accuracy, which is in stark contrast to the 128 bits required for latitude and longitude floating point values. It is to be appreciated that the use of 14 quantization bits in the highest LOD grid is merely for illustration purposes only. It is further to be appreciated that the geometric algorithms according to the present invention may be used with spatial, quantized vector data obtained by whatever quantization method is used to produce the quantized vector data. The above discussion with respect to obtaining quantized vector data according to grids is to illustrate one example of providing quantized vector data, and is not to be construed as limiting of the invention. While being a significant improvement over latitude and longitude, quantized vector data can be further improved by expressing the coordinates in still smaller integers requiring less storage than even quantized vector data.

In accordance with the present invention, quantized vector data can be expressed in arrays having integers requiring less storage space as compared with quantized vector data, and whose integer values are closer to zero in comparison to the integer values of quantized vector data. Furthermore, dividing and/or assigning the data according to geographic location in grids in accordance with the invention, results in a grid that may be the smallest piece of compressed byte data that can be independently replaced or modified. In other words, a single grid of compressed bytes (a volume of typically a few kilobytes), rather than the entire body of compressed byte data (which may be hundreds of megabytes) can be independently compressed, stored, transmitted, decompressed, or modified and updated, rather than working with the entire body of data. In accordance with the present invention, by dividing a large data file into grids, it becomes possible to install only part of a map, download individual geographic regions onto the computing device, and manage specific map content to fit the available storage space.

In one embodiment, the present invention provides methods for use in the compression of quantized vector data, wherein the data represents spatial elements, in quantized form. The present invention provides a selection from a plurality of methods, wherein each method is tailored for a certain kind of quantized vector data. The compressed bytes may be transmitted over a communication network, such as the global TCP/IP network community commonly referred to as the Internet. Alternatively, the compressed bytes may be stored on a mass storage device, such as a CD. The contents of the CD, including the compressed bytes, may be downloaded to a personal computer, either for decompressing on the personal computer or for transferring a second device via a USB. The compressed bytes are obtained by a computing device, having a computer processor and readable medium with instructions for decompressing the data including using one of the embodiments in accordance with the invention.

Delta-Encoding

Delta-encoding is a technique to encode an array of quantized vertices having true integer values into arrays of vertices having integers smaller than the true values, yet still represent the same physical location. Delta-encoding is the term given to the process of expressing an array of integers by a difference (delta) between successive integers rather than the true value.

For example, to delta-encode the array of integers (47, 50, 60, 61, 61, 61, 67, 70), the first true value of the array is stored. Subsequent values are each stored as a "delta" (change) from the previous integer. Thus, delta-encoding is suitable for an array of integers that may cover a wide range of values, but where the change from one value to the next is typically smaller than the full range covered by the collection as a whole. This is a characteristic associated with, for example, sorted numbers. For example, in the array of the example, using the integers; 47, 50, 60, 61, 61, 61, 67, and 70, delta-encoding includes storing the true value of the first item (47), and all subsequent items are stored as deltas or changes from the immediately preceding item. The second value in this example would be 3 (50−47=3), and the third value would be 10 (60−50=10). Thus, delta-encoding the array in this example array would result in the delta-encoded array; 47, 3, 10, 1, 0, 0, 6, 3.

With the exception of the first value, this form of the array has integer values much closer to zero than the initial quantized form, such that the number of binary code bits can be considerably reduced with delta-encoding.

Simple Delta Compression

Figure 6A:
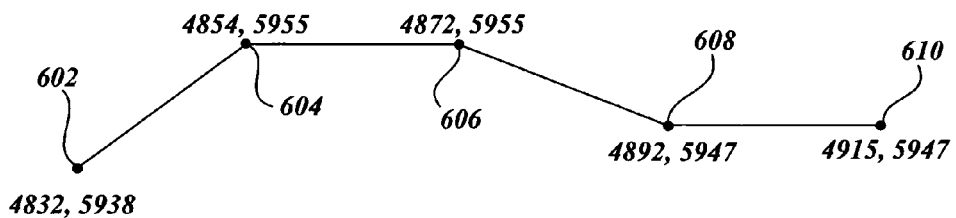
FIGS. 6A and 6B are diagrams of a representative polyline showing quantized vector data and delta-encoded vector data according to the present invention.

Road data for maps is usually provided in vector data comprising vertices. The vertices in latitude and longitude are first converted to quantized vector data, such as according to the grid system of the invention. The data is converted into X, Y integer pairs that provide the locations of various points along the road. The simplest way to store a primitive with multiple quantized vertices (i.e., a polyline or polygon) is simply to store the true X, Y coordinates of each quantized vertex, as shown in FIG. 6A, wherein each vertex is expressed as a pair of four digit integers.

Figure 6B:
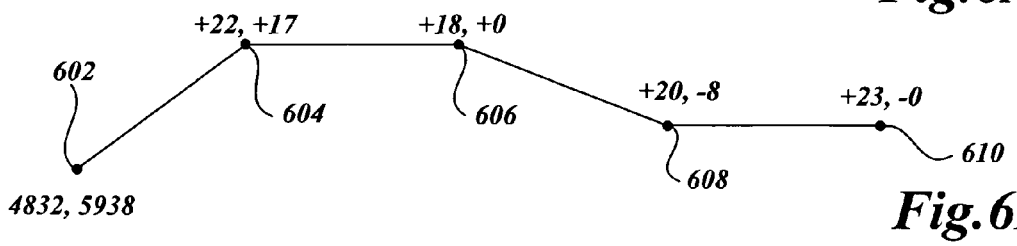

The use of the true X, Y integer coordinates is wasteful, since the X and Y coordinates may be large integers, and generally, compression engines are most efficient with small integers close to zero. The amount of storage may be reduced by delta-encoding. Delta-encoding requires storing the true value of the first X, Y coordinates (quantized vertex), and storing successive quantized vertices as deltas (changes from the previous value), as shown in FIG. 6B. FIG. 6B shows all vertices except for vertex 602 being stored as deltas from the previous values. The vertices 604, 606, 608, and 610 in FIG. 6B represent the same locations as vertices 604, 606, 608, and 610 in FIG. 6A, a difference being that the vertices 604, 606, 608, and 610 in FIG. 6B require less storage, i.e., fewer bits.

Although the delta-encoded array includes the true X, Y coordinate of the first quantized vertex, which is inefficient, the successive vertices' being stored as deltas are efficient because of their smaller values. The storage space will be directly related to the binary code bits stored as either one or zero, as all integers need to be converted to binary code at the processing level, thus, for example, integer numbers to a single significant digit require less binary code bits to store as compared with integer numbers having four significant digits. The method just described in this section is referred to herein as simple delta compression, and is a viable method for generating smaller integers compared to the quantized vector data. However, still smaller integers closer to zero than what are achievable with the simple delta compression method are possible by using one of the geometric algorithms according to the invention. This is made possible by selecting a geometric algorithm that takes advantage of the characteristics of the data, particularly spatial data, which is related to points in space, or points in space connected by lines. The geometric algorithms of the invention include predictive delta, hash point, chaining, and indexing compression.

Predicative Delta Compression

One embodiment of a method in accordance with the present invention is related to encoding primitives, such as polylines, initially expressed as quantized vector data into arrays of integers that require less storage than the quantized vector data or arrays of integers using simple deltas. This embodiment uses a type of delta value and is referred to herein as predictive delta compression.

The possibility may exist that a primitive can have three or more vertices. For example, this is often the case of representing hydrology features, such as rivers, ocean shores, lake shores, and the like. A common feature of these objects is the tendency to generally be straight. In other words, following the contours of a river in a certain direction for a given distance from one vertex to the next, a trend can be perceived such that each succeeding vertex is more likely to continue in substantially the same direction rather than deviate and follow another direction. A river, for example, can be stored as quantized vector data, where the vector elements include vertices for points along the river.

Figure 7:
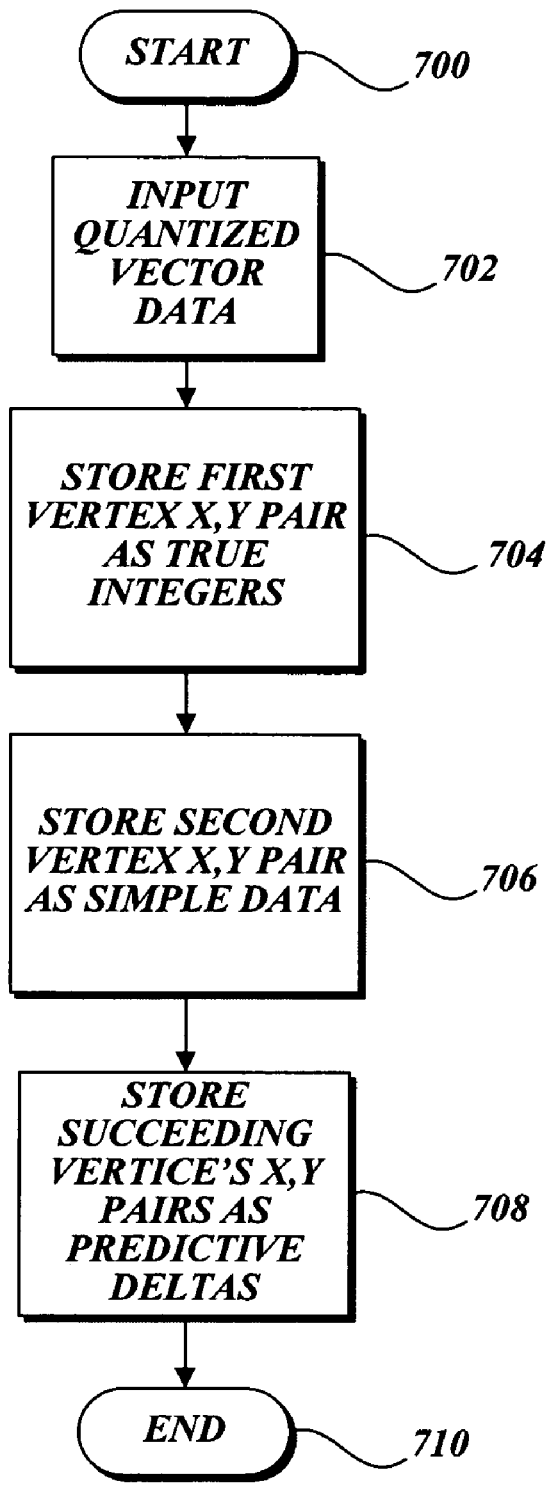
FIG. 7 is a flow diagram of a representative routine for predictive delta compression according to the present invention.

Referring to FIG. 7, the predictive delta compression method in accordance with the invention is illustrated. Rather than use simple deltas, the predictive delta method uses "predicted" deltas. According to the invention, the method includes obtaining quantized vector data, block 702. The X, Y true integer coordinates of the first quantized vertex is a stored, block 704, and the simple delta from the first quantized vertex to the second quantized vertex is also stored, block 706. However, succeeding quantized vertices can be stored as predictive deltas, block 708. The second quantized vertex cannot be expressed as a predictive delta, because there is no quantized vertex before the first quantized vertex to derive a predictive delta. In a previous example, simple deltas are the distance between one quantized vertex and the preceding quantized vertex. However, in the predictive delta compression method in accordance with the present invention, a predictive delta is the difference from a "predicted" position to the succeeding vertex, such that the predicted position is where the succeeding vertex would have been if the preceding simple delta is repeated. If the primitive is substantially straight, then the predictive deltas will be smaller, and closer to zero, than simple deltas. The arrays of integers generated by the predictive delta method can be input to a compression engine to generate compressed bytes of data.

Figure 8:
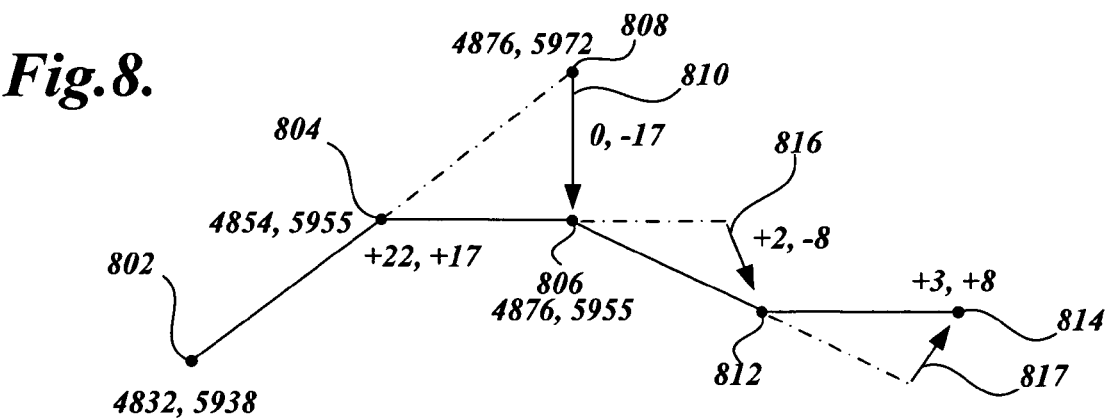
FIG. 8 is a diagram of a representative polyline with predictive delta-encoded vector data according to the present invention.

Referring to FIG. 8, an example of the predictive delta compression method is illustrated. A first quantized vertex 802 has the true integer coordinates 4832 and 5938. A second quantized vertex 804 has the true integer coordinates 4854, 5955. Therefore, quantized vertex 804 has simple deltas of +22 and +17. In the predictive delta compression method in accordance with the present invention, the third quantized vertex 806 is stored as 0 and −17. To find out why, consider that location 808 has the coordinates 4876, 5955. These coordinates correspond with the prediction that the third quantized vertex would have fallen exactly in the same direction and magnitude from the second vertex 804 as the second vertex 804 falls from the first vertex 802 (i.e., the simple delta is repeated). In this example, however, the third vertex 806 has the true coordinates 4876, 5955. Using the simple delta method, third quantized vertex 806 could be expressed in simple deltas as +22, 0. However, smaller integers are obtained if one measures deltas from the predicted location 808 to the actual third vertex 806 to obtain the predicted delta, rather than the simple delta. The predictive delta of vertex 806 is calculated as 4876−4876=0; and 5955−5972=−17. This results in a predictive delta 810 for vertex 806 of 0 for X and −17 for Y. However, if, on the other hand, only simple deltas are used, then the vertex 806 would have been expressed as +22 and 0, which overall includes larger integers than 0 and −17. The predicted deltas are used for quantized vertices 806, 812, and 814; again, by predicting that every succeeding vertex will fall exactly where the simple delta would have resulted, and taking the difference from such location to the actual vertex location. Therefore, the fourth vertex 812 can be stored as predicted deltas +2 and −8, rather than simple deltas +24, −8. The fifth vertex 814 can be stored as predicted deltas +3, +8, rather than simple deltas +27, 0.

As shown, the predictive delta compression method in accordance with the invention results in lower integer values than the simple deltas between vertices. The integers obtained by the predictive delta method tend to be closer to zero than the integers obtained by the simple delta method. The predictive delta method can therefore be used to provide an array of integers describing any hydrology feature of a map. It is to be appreciated that the use of the predictive delta method for data compression of hydrology features is merely to illustrate one embodiment of the invention, and should not be construed as limiting of the invention.

Hash Point Compression

One embodiment of a method in accordance with the present invention is related to encoding quantized vector data having a single vertex, i.e., points, into arrays of integers that require less storage than the quantized vector data, and have integers closer to zero than the quantized vector data. This embodiment is referred to herein as hash point compression. The hash point compression method is suitable to be used for compressing data corresponding to the location of unconnected points in space on a map, such as restaurants, movie theaters, and the like. Unlike other uses of the term "hash" in the general art, as used herein "hash code" or simply "hash" refers to a reversible hash generated from a vertex that may be subsequently reconverted from a hash into the original vertex, completely and losslessly (i.e., without loss of fidelity). Thus, the hash codes of the invention are reversible.

Figure 9:
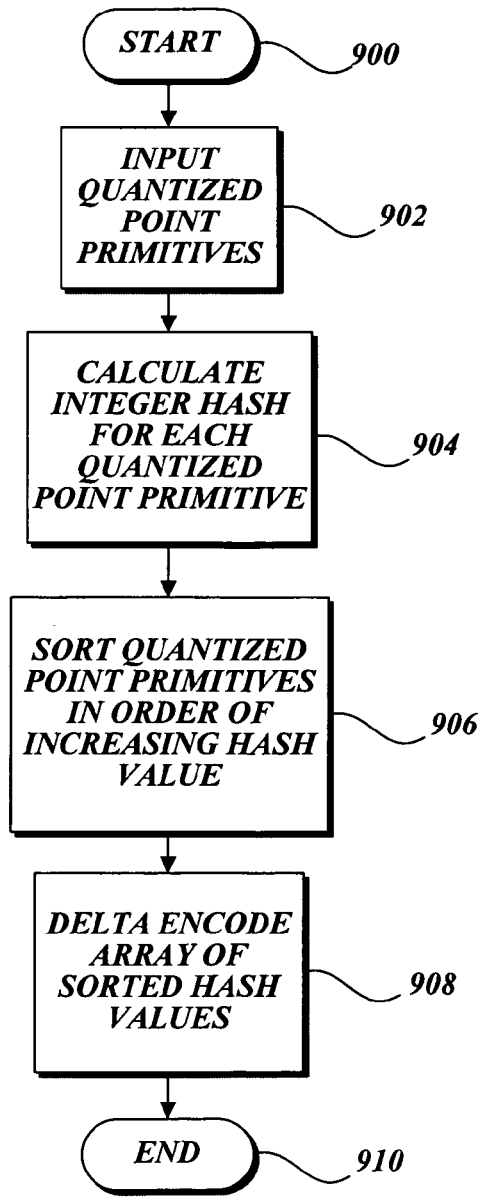
FIG. 9 is a flow diagram of a representative hash point compression routine according to the present invention.
Figure 10:
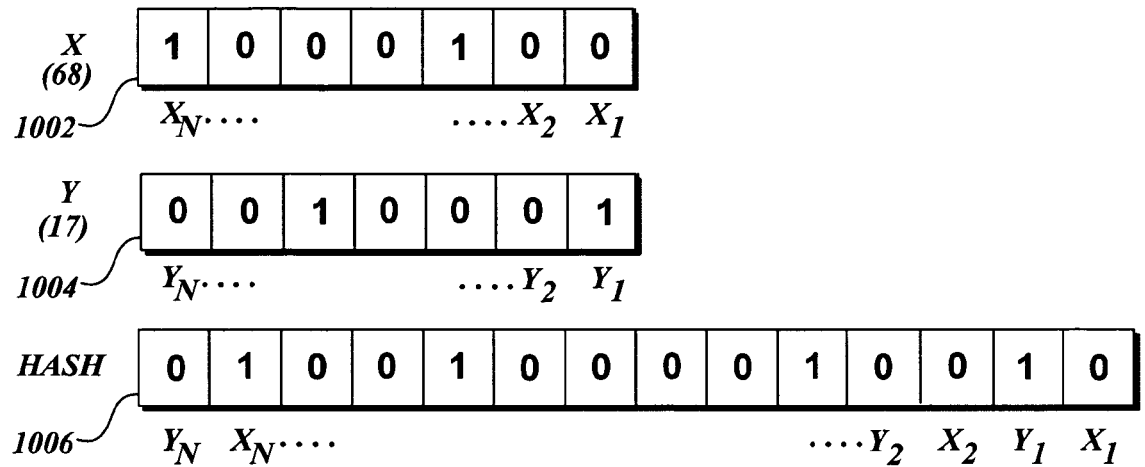
FIG. 10 is a diagram of a representative hash code generated by interleaving a first and second binary code in the hash point compression routine according to the present invention.

Referring to FIG. 9, the method in accordance with the present invention includes obtaining a collection of one or more quantized point primitives, block 902, which include the X, Y coordinates of vertices in true integers. The method includes calculating an integer "hash" from each of the true X, Y values of the point's coordinates, block 904. A hash is further discussed below in association with FIGS. 10 and 11. The method includes sorting the points in order according to the increasing hash value, block 906. The array of sorted hash values is delta-encoded as simple deltas, block 908. The hash point compression method yields arrays of integers, whose values tend to be close to zero. The resulting integer arrays can be input to the compression engine.

Any X or Y integer value of a quantized data point can be represented in binary code as a number of binary bits, being either a 1 or a 0. Each bit for the X or Y integer in binary code is numbered 1 through N, where N is the number of quantization bits used when generating the quantized point from non-quantized vector data. After having represented both X and Y integers in binary code, a hash is generated for the primitive by interleaving the binary bits for both the X and Y integer values. For example, referring to FIG. 10, to generate a hash code from the X binary code in register 1002 for integer 68 and the Y binary code in register 1004 for integer 17, bit 1 of X becomes bit 1 of the hash; bit 1 of Y becomes bit 2 of the hash; bit 2 of X becomes bit 3 of the hash; bit 2 of Y becomes bit 4 of the hash; and so forth. In other words, if the X bits are labeled as X1, X2, . . . X and the Y bits are labeled as Y1, Y2, . . . YN, then the hash code in register 1006, or simply hash, will be X1, Y1, X2, Y2, . . . XN, YN.

Note that this particular method of calculating the hash code is for illustrative purposes only, and should not be construed as limiting the invention. Hash point compression applies to hashes calculated in any fashion, as long as the hashes satisfy two conditions. First, they are reversible (that is, the original X,Y point is recoverable at full fidelity from a hash code), and, second, the method is such that points that are physically close together in two-dimensional space will tend to have hash values that are close together.

After computing hash codes for all quantized data points, the hash codes are sorted in order of increasing hash codes. Each hash code represents an integer. Therefore, the collection of hash codes in order of increasing value can be delta-encoded by storing the first hash code and succeeding hash codes using simple deltas to result in an array that contains integers that will have smaller values and are closer to zero than the quantized data. As a result of hash point compression, points that are close together in space will result in arrays of delta-encoded hash values that are close to zero, which in turn will be highly compressed by the compression engine.

Figure 11:
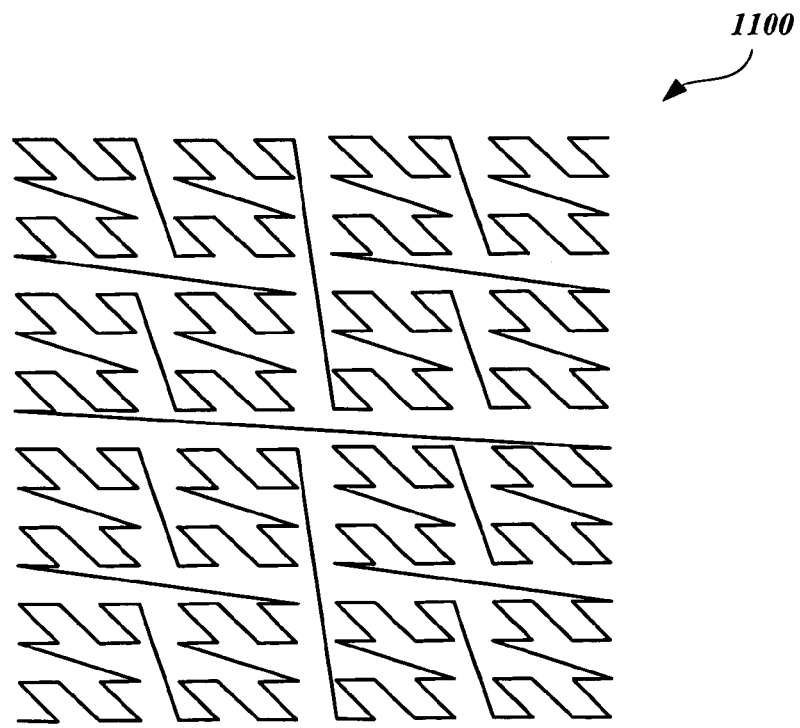
FIG. 11 is a diagram of a representative line in space created by plotting vertices generated by the hash point compression routine according to the present invention.

A representative embodiment of a pattern 1100 in space created by plotting the vertices of the ordered, increasing hash values is shown in FIG. 11. For example, the hash codes for vertices may be (0); (1); and (10), and so forth so that hash code (0) represents the X, Y integer pair 0, 0. Hash code (1) represents the integer pair 1, 0. Hash code (10) represents the integer pair 0, 1, and so forth. A noteworthy feature of the pattern 1100 is that points that are physically close to each other in space will tend to have hash codes that are close together, and points that are physically separated from each other in space will tend to have hash codes that are farther apart. In other words, points that are distributed in a "clumpy" fashion (as opposed to being evenly distributed), will compress more effectively than non-clumped points. Since points of geographic data (such as map features) tend to be highly clumped, such as restaurants located along a busy street, the hash point compression method achieves a favorable compression ratio. Furthermore, the higher the overall density of points, the better the compression ratio will be, since a higher density of points means that a point's nearest neighbor will, on average, be closer. As with the other embodiments described herein, the hash point compression method provides one or more arrays of signed integers, requiring less storage than the quantized vector data, and whose integer values tend to be closer to zero compared with the integer values of the quantized data.

Chaining Compression

One embodiment of a method in accordance with the present invention is related to encoding primitives, such as interconnected networks of polylines, and is referred to herein as chaining compression. Chaining compression is suitable for use in processing quantized vector data into arrays having integers, requiring less storage as compared with quantized vector data and whose values tend to be closer to zero as compared with the integer values of the quantized vector data. The chaining compression method is preferred for interconnected networks of polylines, such as roads on a map. Road data typically has intersections of one road intersecting a plurality of roads. The method of the invention takes advantage that the end point of one road segment is usually the start of one or more other road segments, at the intersection. Roads tend to be straight, and the roads tend to continue straight through intersections.

Figure 12:
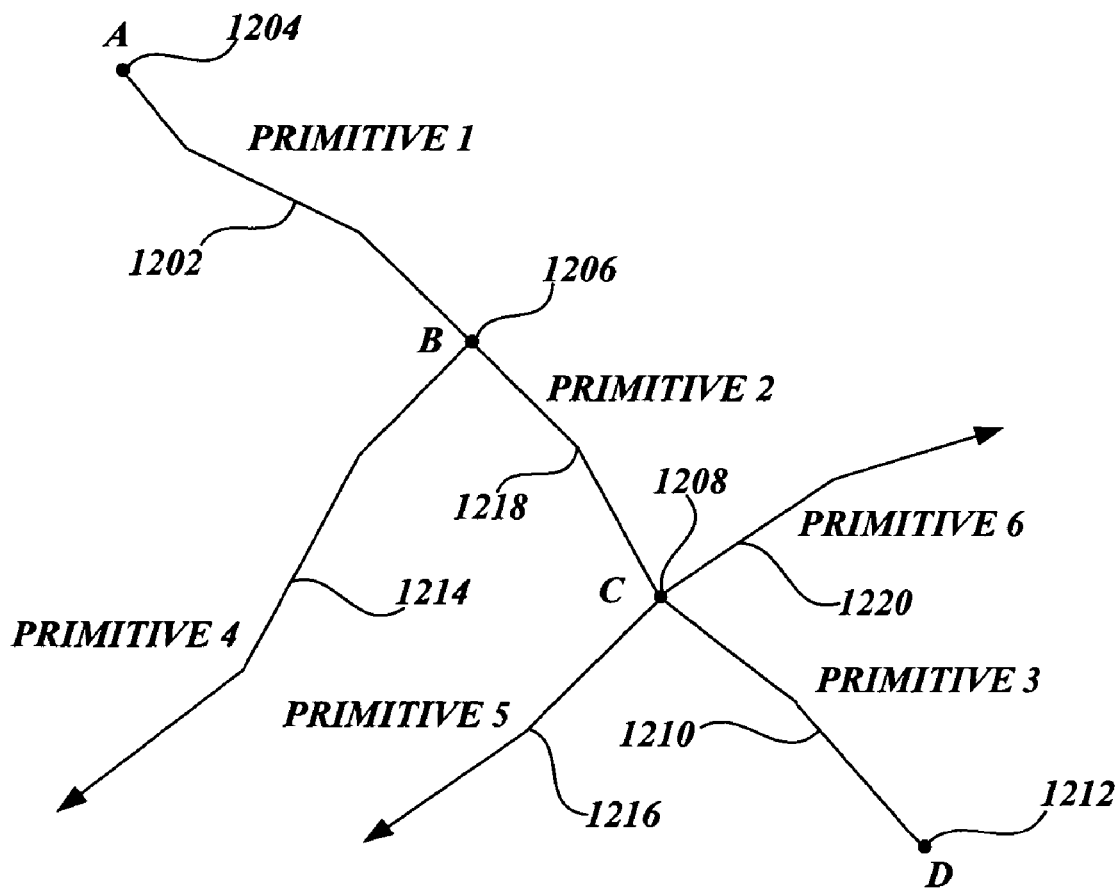
FIG. 12 is a diagram of a representative network of interconnected polylines according to the present invention.

According to the present invention, chaining compression significantly eliminates duplication of quantized vertices when multiple primitives share an end point. The chaining compression method enables curve prediction by effectively combining multiple successive short primitives into a single long chain. FIG. 12 illustrates a collection of interconnected primitives (polylines) that may represent a road network that may be converted from quantized vector data into arrays having integers with values smaller than the quantized vector data.

Referring to FIG. 12, primitive 1 (1202) starts at vertex A (1204) and ends at vertex B (1206). Primitive 2 (1218) starts at vertex B (1206) and ends at vertex C (1208). Primitive 3 (1210) starts at vertex C (1208) and ends at vertex D (1212). Primitive 4 (1214) starts at vertex B (1206). Primitives 5 (1216) and 6 (1220) start from vertex C (1208). It is to be appreciated that primitives will have other vertices besides the ones expressly identified. For ease of understanding, these will be omitted from FIG. 12. Primitives 1202, 1218, and 1210 are substantially co-linear with respect to one another. In other words, not only does primitive 1218 begin where primitive 1202 ends, but primitive 1218 is also substantially in the same direction as primitive 1202. Likewise, primitive 1210 starts where primitive 1218 ends, and primitive 1210 continues in substantially the same direction as primitive 1218. Such characteristics are also shared by road data in a map. The chaining compression method is a highly effective method for converting quantized vector data of polyline primitives into arrays having integers, requiring less storage than quantized vector data and whose values are closer to zero as compared with the quantized vector data. Primitives 1202, 1218, and 1210 may constitute a chain and may be considered to represent the same road. However, the road may be split into primitives at each intersection with other primitives 1214, 1216, and 1220, to facilitate routing and organizing and indexing the data. A list of the terms and the definitions used in the chaining compression method are provided below.

"Chain" is a collection of primitives that has the property that the last vertex of each primitive is spatially substantially congruent with the first vertex of the succeeding primitive. In FIG. 12, primitives 1202, 1218, and 1210 make up a chain.

"Link" is one of the primitives that make up a chain. In this section, primitive and link are interchangeable terms.

"Chain direction" refers to a characteristic of a chain having one of two orientations, forward or backward. A forward chain is one that begins at the starting vertex of its first link, and succeeding links are such that the starting vertex of link N+1 is the ending vertex of link N. A backward chain begins at the ending vertex of the first link, and succeeding links are such that the ending vertex of link N+1 is the starting vertex of link N.

"Segment" is a section of a primitive between two successive vertices. A primitive with N vertices has N−1 segments.

"Node" is a vertex within a chain that is the start or end vertex of a link in the chain. A chain with N links will have N+1 nodes. In FIG. 12, vertices 1204, 1206, 1208, and 1212 are nodes.

"Tangle" is a set of interconnected chains that has the property that each chain therein has its first vertex, last vertex, or both congruent with a node in one or more of the other chains. Topologically, a tangle is a tree, however, it is possible that the chains could also intersect each other at places other than their nodes and end points.

"Tangle parent" is the first chain in a tangle, the chain from which all other chains in the tangle eventually spring. In FIG. 12, the chain made up of primitives 1202, 1218, and 1210 is the tangle parent.

"Child chain" is a chain that springs from a chain's node. In FIG. 12, the child chains that spring from vertices 1206 and 1208 are children of the chain made up of primitives 1202, 1218, and 1210.

Figure 13:
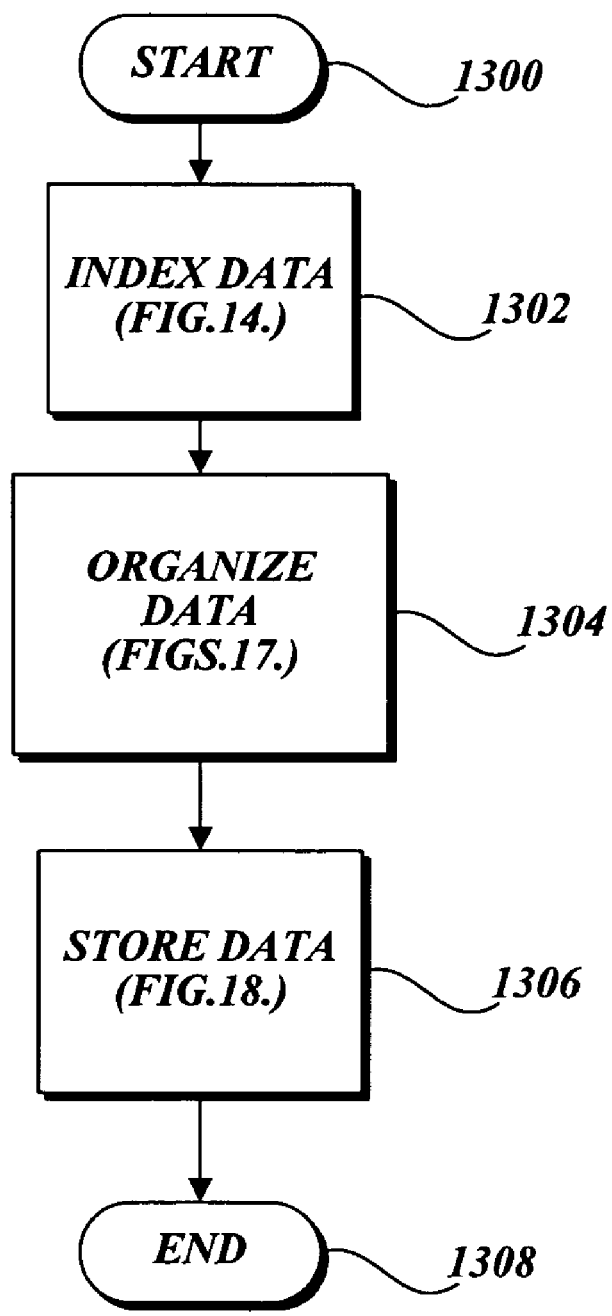
FIG. 13 is a flow diagram of a representative chaining compression routine according to the present invention.

Referring to FIG. 13, the chaining compression method in accordance with the invention includes indexing data, block 1302; organizing data, block 1304; and storing data, block 1306.

Block 1302: Index the Data

Figure 14:
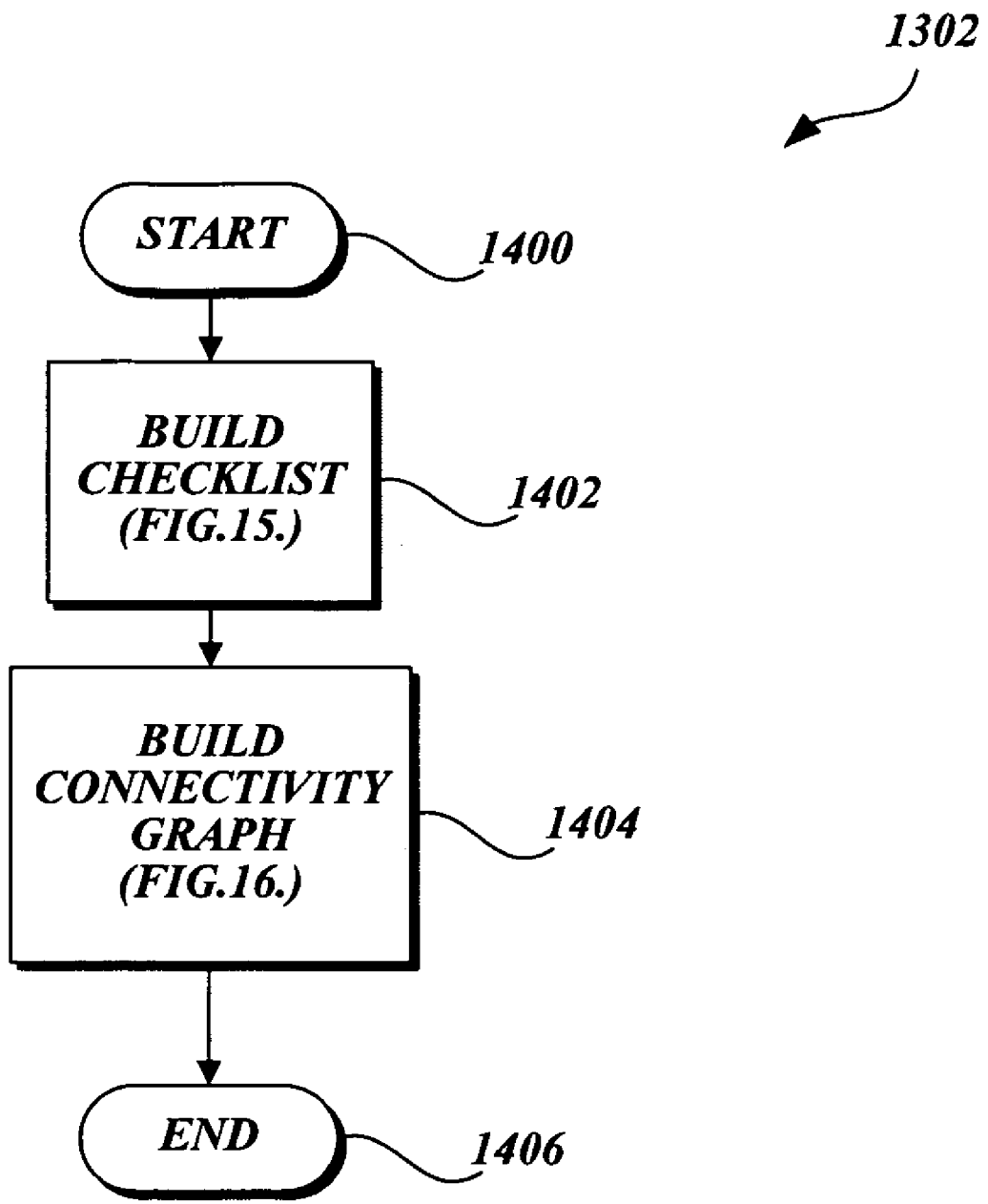
FIG. 14 is a flow diagram of a representative indexing data routine for the chaining compression routine according to the present invention.
Figures 15, 16:
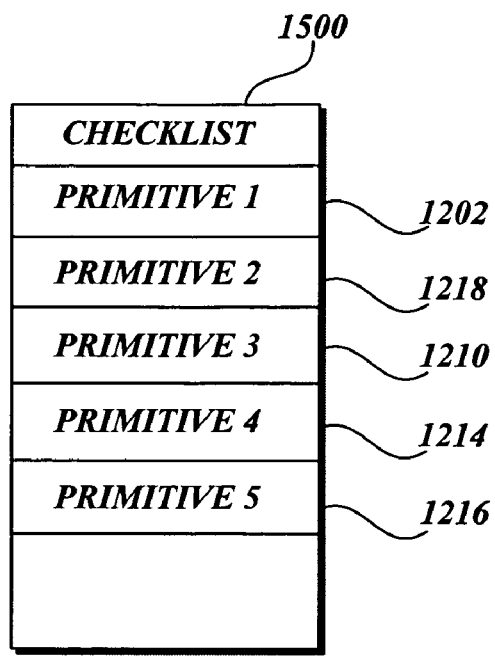
FIG. 15 is a diagram of a representative checklist data structure for the chaining compression routine according to the present invention.
FIG. 16 is a diagram of a representative connectivity graph data structure for the chaining compression routine according to the present invention.

Referring to FIG. 14, the indexing data routine 1302 includes building a checklist, block 1402, and building a connectivity graph, block 1404. According to the present invention, the chaining compression method utilizes at least two data structures: a checklist, shown in FIG. 15 and a connectivity graph, shown in FIG. 16. It is to be appreciated that the checklist and connectivity graph illustrated in FIGS. 15 and 16, respectively, are representative of one embodiment of the invention, and are used to illustrate organizing the data when the primitives do not have connectivity information associated with the primitives. Depending on the nature of the input vector data, the checklist and connectivity graph may not be necessary. In the example that is being used for purposes of illustrating the invention, the primitives are stored according to the vertices of the primitives and not by connectivity data. However, in another embodiment, the primitives may be stored with connectivity information as part of the primitives, thus obviating the need for the connectivity graph. The checklist and connectivity graph data structures are used in the build-time process, but may be omitted from the run-time process. A characteristic of the embodiments of the invention is the reorganization of data to a more efficient organization. The checklist 1500 is a list of all primitives in a grid, organized for efficient reference according to primitive. In the case of road data, a primitive may be a polyline. At the start of the chaining compression method, every primitive is present in the checklist data structure 1500. As each primitive is output into arrays of integers requiring less storage compared with quantized vector data, and whose integer values are closer to zero, the primitive is removed from the checklist. Thus, when the checklist data structure is empty, all primitives have been output for a grid. The need for the checklist arises because the order in which the primitives are output is different from the order in which the primitives are input. As the example, the primitives illustrated in FIG. 12 are provided in the checklist 1500.

The connectivity graph data structure 1600 allows referencing all of the primitives that begin or end at a given vertex. Given a X,Y pair of integer values in the list 1606, a collection of the connected primitives can be referenced in two lists: a list of the primitives 1602 that start at the location, and a list of the primitives 1604 that end at the location. As an example, the primitives of FIG. 12 are indexed in the connectivity graph 1600 by starting vertex and ending vertex. Once indexing the data, block 1302, is completed by generating the checklist and connectivity graph data structures, the data can be organized in block 1304.

Block 1304: Organize the Data

To organize the data, the method in accordance with the present invention includes that for every tangle of interconnected chains, each chain beginning with the tangle parent is "grown" to its end, followed by growing every child chain that sprouts from a previous chain until all chains in the tangle are grown to their end, for all tangles in a grid.

Figure 17:
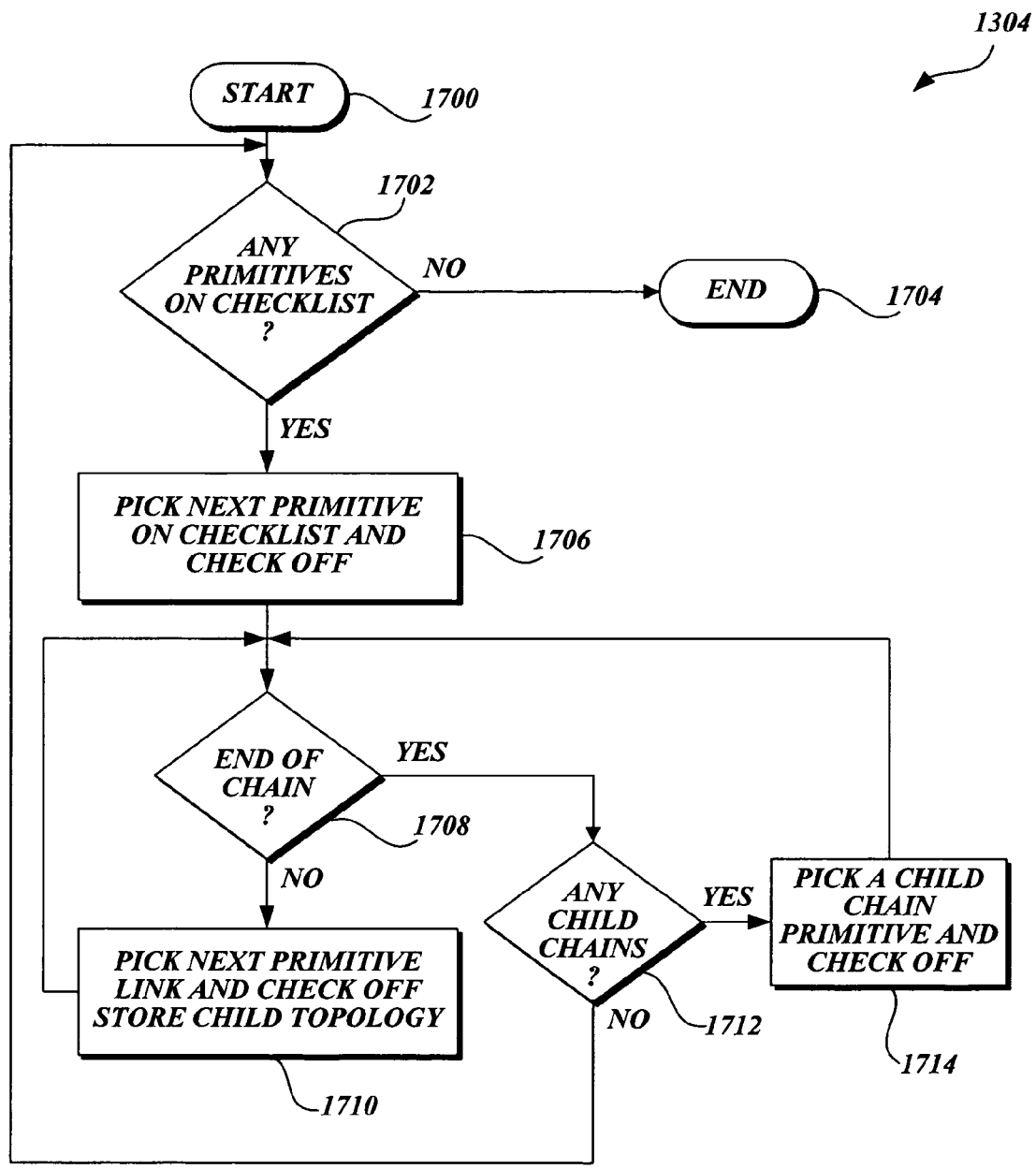
FIG. 17 is a flow diagram of a representative organizing data routine for the chaining compression routine according to the present invention.

Referring to FIG. 17, the organize data routine 1304 is illustrated. In block 1702, a determination is made whether there are any primitives in the checklist data structure that have not been checked off. If there are no primitives on the checklist, then the organize data routine is at an end, block 1704. However, if there are primitives on the checklist, then the next primitive on the checklist is selected and the primitive is checked off the checklist data structure, block 1706. In block 1708, a determination is made whether the last primitive that was selected is the last link in the chain, and therefore, the end of a chain. If the last primitive that was selected is not the end of the chain, then, in block 1710, the next primitive or link in the chain is determined and child chain information is collected. In block 1710, the next primitive is determined from the connectivity graph by referencing the ending vertex of the last primitive and determining whether there are primitives that start at that ending vertex and that have not already been checked off the checklist. If there are no primitives that start at the end vertex, then the primitive is the end of the chain. If there is only one primitive that starts at the end vertex, then that primitive is the next link in the chain even if that primitive has a first segment that is not ideally spatially congruent with the last segment of the previous link. If there are two or more primitives that start at the end vertex, then the primitive that is the straightest (that is, the primitive whose first segment is the closest to being in the same direction as the last segment of the previous primitive) is selected as the next link in the chain, and the other primitives are regarded as the start of child chains, provided that the primitives have not already been checked off the checklist. If a child chain is determined to exist, then the child topology is collected and stored, also in block 1710. Child topology refers to storing a pair of integers, wherein the first integer represents the number of nodes from the last node that had child chains starting from it (or the start of the chain, if no previous node had child chains) to the start of the child chain, and the second integer stores the number of child chains that start at such node. After having determined the next link in the chain and any child topology information, block 1710 is complete, and a determination is again made whether the primitive that was just selected as the next link is the last link in the chain and the end of the chain by returning to block 1708. While there continues to be no end to the chain, succeeding primitive chain links are selected, checked off the checklist data structure, and any child topology is determined and stored, continuously in block 1710. When a chain does come to an end, a determination is made whether there are any child chains branching off from the chain that was just determined to be at an end, block 1712. If there are no child chains remaining, reference is again made to the checklist data structure to determine whether there are any remaining primitives on the checklist by returning to block 1702. If there is a child chain, the starting primitive link in the child chain is selected and is checked off the checklist data structure in block 1714. A determination is made whether the child chain is at an end by returning to block 1708. Thus, for any chain, including child chains, while the chain is not at an end, select the next primitive link in the chain, check off the primitive from the checklist, and collect child chain topology in block 1710, as described above. The organize data routine 1304 is carried out until there are no child chains remaining and there are no more primitives on the checklist.

Block 1306: Store the Data

Figure 18:
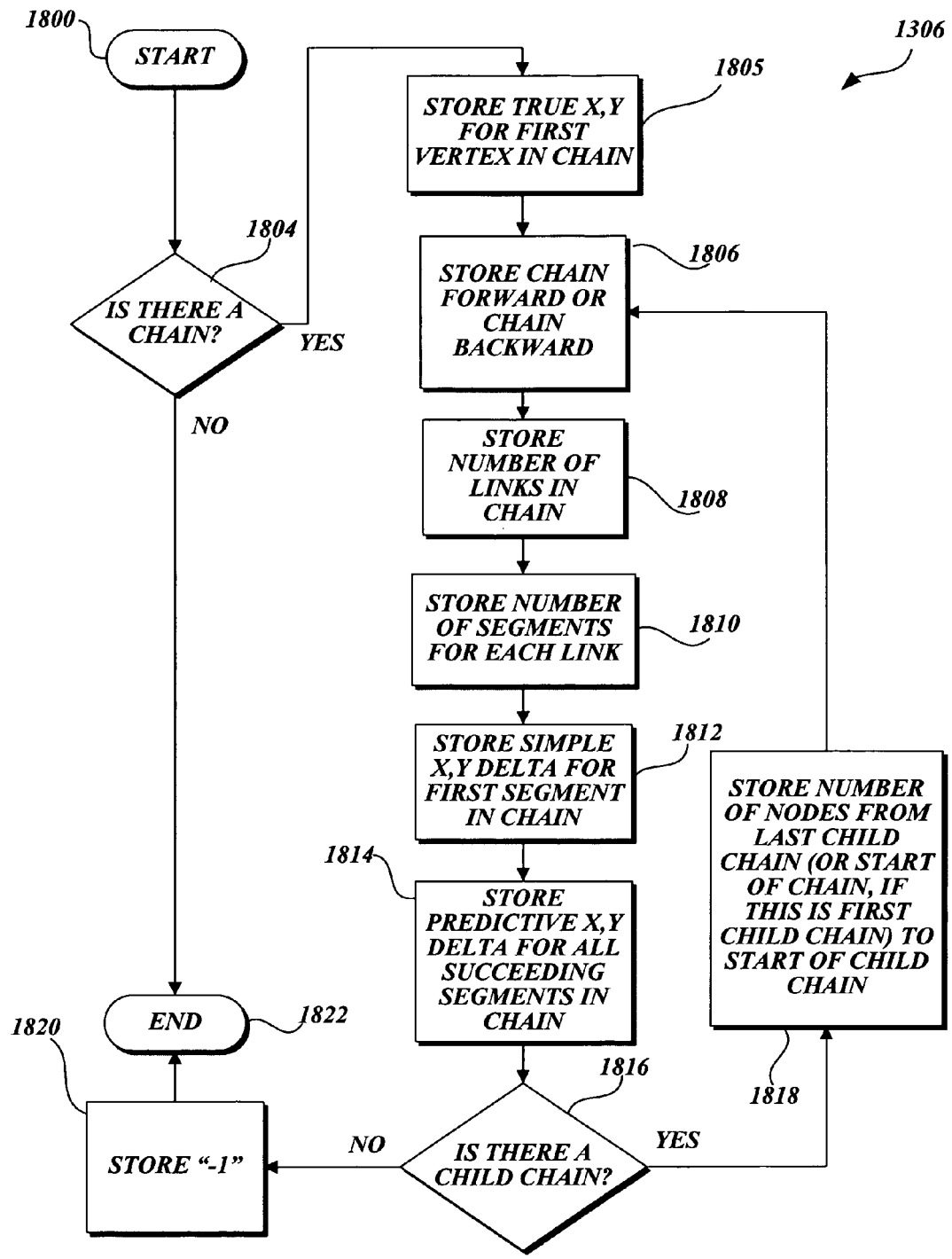
FIG. 18 is a flow diagram of a representative storing data routine for the chaining compression routine according to the present invention.

Referring now to FIG. 18, the store data routine 1306, is illustrated. Store data routine 1306 is for storing the primitives in a series of arrays of integers, whose values are closer to zero than the quantized vector data, and require less storage space. A determination is made in block 1804 whether there is a chain. If there is not a chain (i.e. if there is no data whatsoever), the storing of data routine is at an end, block 1822. If there is a chain, then for the first chain in the tangle, store the true X, Y coordinates of the first vertex in the chain, block 1805. Store whether the chain is oriented forward or backward by selecting 0 for forward and 1 for backwards, block 1806. For each chain in the tangle, store the number of links in each chain, stored as simple deltas, block 1808. For each primitive link in the chain, store the number of segments that make up the chain, stored as simple deltas, block 1810. For each chain, store the simple X, Y delta for the first segment (the simple deltas to the first vertex) in the chain, block 1812. For each chain, store a predictive X, Y delta for all succeeding segments (the remaining vertices) in the chain, block 1814. A determination is made in block 1816 whether there are any child chains. For all the child chains, store the number of nodes from the starting node of the parent chain to the starting node of the child chain and store the number of child chains that branch from such node, block 1818. For every child chain, return to block 1806 to store the chain orientation of the child chain, block 1806 (note that the true X, Y integer value of the child's first vertex is not stored, block 1805). Store the number of links in the child chain, block 1808, store the number of segments for each primitive link in the child chain, block 1810, store a simple X, Y delta for the first segment (the simple deltas to the first vertex) in the child chain, block 1812, and store predictive X, Y deltas (the remaining vertices) for all succeeding segments in the child chain, block 1814. Accordingly, the child chains are stored similarly to the tangle parent chain for blocks 1806 through 1814. Continue to determine whether there are any remaining child chains in block 1816. While there continues to be child chains, continue to store child chain information in blocks 1818 and blocks 1806-1814. When there are no more remaining child chains, store a (−1), block 1820, and the storing of the data for the tangle is completed. The store data routine 1306 of FIG. 18 is repeated for every other tangle in the grid to complete storing data for one grid.

The stored data is output as a series of integer arrays. The integer arrays are used as input for the compression engine for final compression.

For illustration purposes, the tangle of FIG. 12, will be used as an example of the chaining compression method. At the start, five primitives are on the checklist. The first primitive 1202 on the checklist 1500 is selected to be the first link of the tangle parent chain. Primitive 1202 is removed from the checklist data structure 1500. The first primitive 1202 that starts at vertex 1204 and ends at vertex 1206, may have additional vertices between vertex 1204 and vertex 1206 that are not shown. Therefore, the first primitive can be stored by the true X, Y integer values of vertex 1204, followed by one simple delta, and N−2 predictive deltas, where N is the total number of quantized vertices in the primitive 1202. After storing the primitive 1202, reference is made to the end vertex 1206 of primitive 1202 (or, for backward oriented chains, the start vertex). The X, Y integer coordinates of the end vertex 1206 are obtained from the connectivity graph 1600. In the example, the end vertex 1206 of primitive 1202 has the coordinates 578, 629. From the connectivity graph data structure 1600, all the primitives that start (or for backward oriented chains that end) at that location are obtained. In the example, the primitives that start with coordinates 578, 629 include primitive 1218 and primitive 1214. All primitives from that list (primitives 1218 and 1214) that have already been checked off the checklist data structure are eliminated. In the example, therefore, none have been checked off, so primitive 1218 and primitive 1214 will remain on the checklist data structure 1500. Had there been no primitives that start at vertex 578, 629, the chain would be at an end, and the method would have proceeded with organizing the child chains. However, in the example, primitives 1218 and 1214 still remain in the checklist data structure 1500, and also start at vertex 578, 629. If there is only one primitive, then the only primitive is the next link in the chain. If there is more than one primitive, the primitive that continues substantially the straightest (i.e., whose first segment is the closest vector match to the last segment of the preceding link) is selected. In the example, primitive 1218 will be selected as the next link because primitive 1218 has the first segment that is the closest match to the last segment of the preceding primitive link 1202. Primitive 1218 can now be checked off the checklist. Primitive 1214 will, therefore, later become the start of a child chain. The topology of the child chain that has primitive 1214 as the first link in the child chain includes the integers 1, 1, because there is only one node (vertex 1206) from the start node (vertex 1204) to the node (vertex 1206) from which the child chain branches. The second integer (1) represents that a single child chain branches from vertex 1206. For primitive 1218, all vertices between vertex 1206 to vertex 1208, inclusive of vertex 1208, are stored. Since the start vertex 1206 has already been stored, there is no need to store vertex 1206 again. One advantage to the present method in accordance with the invention is the elimination of redundancy. Therefore, the first vertex after vertex 1206 in primitive 1218 can be stored as a simple delta, and the remaining vertices in primitive 1218 can be stored as predictive deltas. A determination is made whether primitive 1218 is the end of the chain that started with primitive 1202. Primitive 1218 has an end vertex 1208 with coordinates 634 and 578. From the connectivity graph data structure 1600, the primitives that start at 634 and 578 include primitives 1210, 1216, and 1220. Primitive 1210 has the next straightest segment, so primitive 1210 is selected and crossed off the checklist data structure 1500 and stored. Again, there is no need to output the start vertex 1208, so the next vertex in primitive 1210 is stored as a simple delta, and the succeeding vertices are stored as predictive deltas. However, other primitives that start at vertex 1208, and have not been checked off the checklist data structure, include primitives 1216 and 1220, so therefore, child topology is determined and stored for chains starting with primitives 1216 and 1220. Primitive 1210 ends at vertex 1212. There are no primitives that start at this vertex, therefore, the chain made up of primitives 1202, 1218, and 1210, will be at an end. The tangle parent chain may be at an end, but the checklist data structure 1500 still contains the primitives 1214, 1216, and 1220. These are the child chains and also need to be stored. To store chains of primitives 1214, 1216, and 1220, the start vertex of each primitive will need to be identified. One can identify where each child chain starts by referencing the topology information gathered for each child chain. The topology of the child chain that begins with primitive 1214 is 1, 1. Primitive 1214 can now be selected, and checked off the checklist 1500. The child chain that begins with primitive 1214 is grown to its end and stored. Again, to avoid redundancy, the starting quantized vertex 1206 does not need to be stored for primitive 1214, so the second quantized vertex in primitive 1214 can be stored as a simple delta, and subsequent quantized vertices can be stored as predictive deltas. Primitives 1216 and 1220 remain on the checklist. The topology for primitives 1216 and 1220 is 1, 2 because there is one node interposed from the last starting node of a child chain (vertex 1206) to the starting node of primitives 1216 and 1220 (vertex 1208), and two chains (those beginning with primitive 1216 and primitive 1220) that sprout at vertex 1208. Chains beginning with primitives 1216 and 1220 are grown to their end, and can be checked off the checklist and stored. In the example, primitives 1216 and 1220 were the last primitives to be checked off the checklist, therefore, the chaining compression routine comes to an end. One tangle and one grid are completed. Had there been more primitives in the checklist, the next primitive would be the new tangle parent chain. When beginning the first chain in a tangle, and every new chain thereafter, a direction has to be assigned to the chain. In the example, the tangle parent that begins with primitive 1202, and the child chains that begin with primitives 1214, 1216, and 1220, can all be assigned a forward orientation. Each tangle therefore, includes at least one true integer X, Y value of the parent tangle chain, at least one simple delta for each chain in the tangle, and the remaining quantized vertices in the tangle can be represented as predictive deltas.

The tangle is complete when all primitives that share a connectivity path to the originating primitive in the tangle are stored. If the checklist data structure is empty, the compressed data may be output as a series of arrays representing the quantized vector data. The series of arrays of integers whose values are closer to zero can be input to the compression engine.

Indexing Compression

One embodiment of a method in accordance with the invention is related to encoding primitives, such as polygons having zero or multiple vertices, and is referred to herein as "indexing compression" Indexing compression encodes quantized vector data into arrays of integers whose values are closer to zero than the quantized vector data integers, thus requiring less storage. This embodiment is effective when there is a large amount of redundancy in the source data (for example, where multiple primitives have vertices at the same location). Maps typically include the boundaries of political divisions, such as states and counties. For example, data for a map of the United States might store a polygon representing Kentucky, a polygon representing Ohio, and a line representing the boundary between them. Vertices located along the Kentucky-Ohio border might be present in the data in triplicate. For example, vertices along the Kentucky polygon's boundary, vertices along the Ohio polygon's boundary, and vertices along the polyline (border) object may all be included in quantized vector data. One advantage to the indexing compression method in accordance with the present invention is the storing of vertices once rather than multiple times.

The indexing compression method in accordance with the present invention utilizes the hashing point compression method, described above, that is generalized to apply to primitives with arbitrary numbers of vertices (and is not restricted to one-vertex primitives). The indexing compression method is particularly effective at compressing data when the level of vertex duplication is high.

Figure 19:
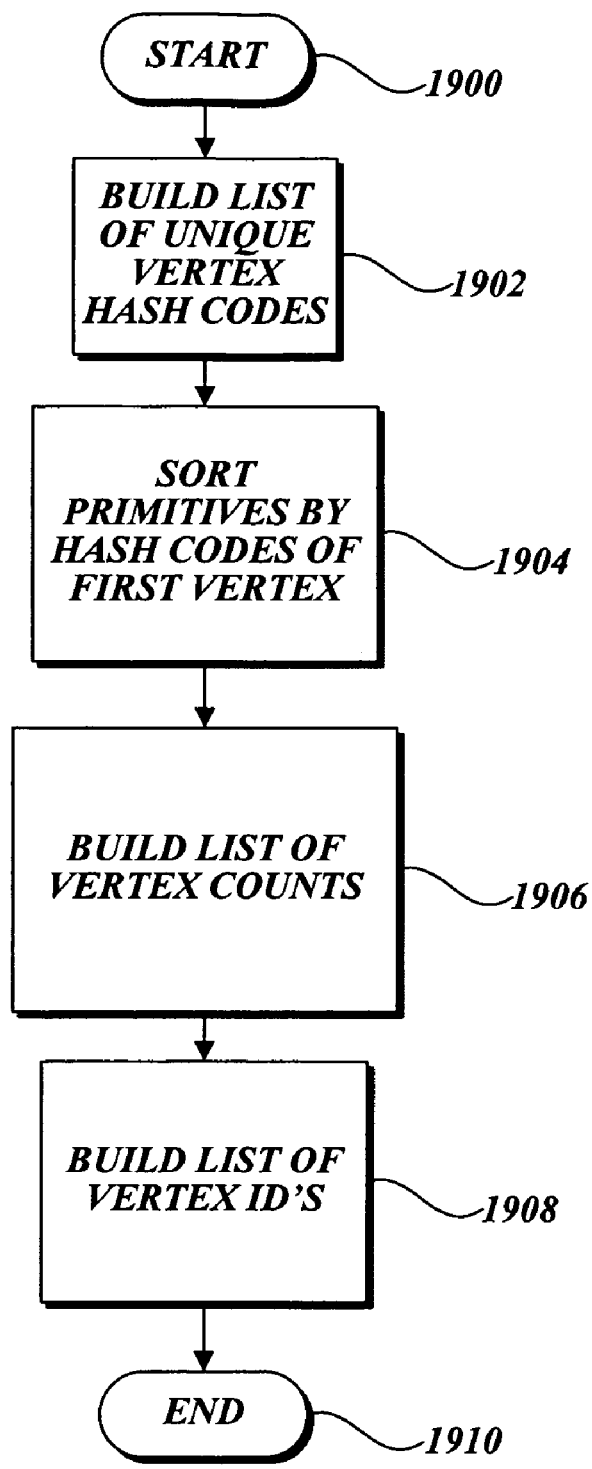
FIG. 19 is a flow diagram of a representative indexing compression routine according to the present invention.

Referring now to FIG. 19, a flow diagram of the indexing routine in accordance with the present invention, is illustrated. The indexing compression method according to the present invention includes building a list of unique vertex hash codes, block 1902, sorting the primitives by hash codes of the first vertex, block 1904, building a list of the vertex counts in every primitive, block 1906, and building a list of the vertex IDs, block 1908.

Block 1902: Build List of Unique Vertex Hash Codes

Primitives, such as polygons, may be obtained that include quantized vector data. For each quantized vertex of each primitive in the quantized vector data, the hash code is obtained using the routine from hash point compression, described above. If the hash code is unique, the hash code is added to a list of unique hash codes. If the list already contains the specified hash code, which means a previous encounter with a quantized vertex at the same location, then the redundant vertex can be discarded during the building of a list containing only unique hash codes. Once a pass through each quantized vertex is complete, the unique hash codes are sorted in increasing order and the resulting data structure may be labeled a vertex index. The vertex index can contain all unique quantized vertices as true integer coordinates, and as hash code. The integer coordinates of any X, Y vertex in a grid can be determined by obtaining the hash code, then correlating the hash code to the integer coordinates in the vertex index data structure. The vertex at the Nth position in the vertex index has an ID of N. The vertex index is stored to the output stream by simple delta-encoding each hash code.

Block 1904: Sort Primitives by Hash Code of First Vertex

An array of integers is created that has the same length as the number of primitives, such as polygons, in the grid. The value of each item in the array is the hash code of the first vertex of the corresponding primitive. If the primitive has zero vertices (which is possible for polygons), a (−1) is stored for the hash code (since "real" hash codes are guaranteed not to be negative). Once this array has been compiled, the primitives are sorted in increasing order of the initial vertex's hash code. This determines the output order of the primitives.

Block 1906: Build List of Vertex Counts

An array of integers that represent the vertex count of each primitive in a grid is built. Vertex count refers to the total number of vertices in the primitive. Redundant vertices are counted in the vertex count. This array can be stored as simple deltas.

Block 1908: Build List of Vertex ID's

An array of integers whose length equals the total number of vertices on all primitives in the grid, is built. The array is populated by making a linear pass through all vertices of all primitives. For each vertex, the vertex ID is referenced as described in block 1902, and the ID is stored in the array. When done, the array is delta-encoded as simple deltas.

When completed, the storing of the quantized vector data in arrays of integers as described above, will result in integers whose values are closer to zero, will require less storage, and be more efficient for compression by a compression engine.

Furthermore, storing the unique vertices as delta-encoded hash codes is an efficient way of storing pluralities of unrelated single points, and completely eliminates vertex duplication. Successive vertices within a primitive will tend to be close to each other physically, which means that they will tend to have hash codes close together, which means having vertex ID's close together. The vertex ID deltas will be small, leading to efficient compression. By sorting the storage order of primitives by the hash code of the first vertex of the primitive means that successive primitives will also tend to be close together so efficiencies in storage will result.

Figure 20:
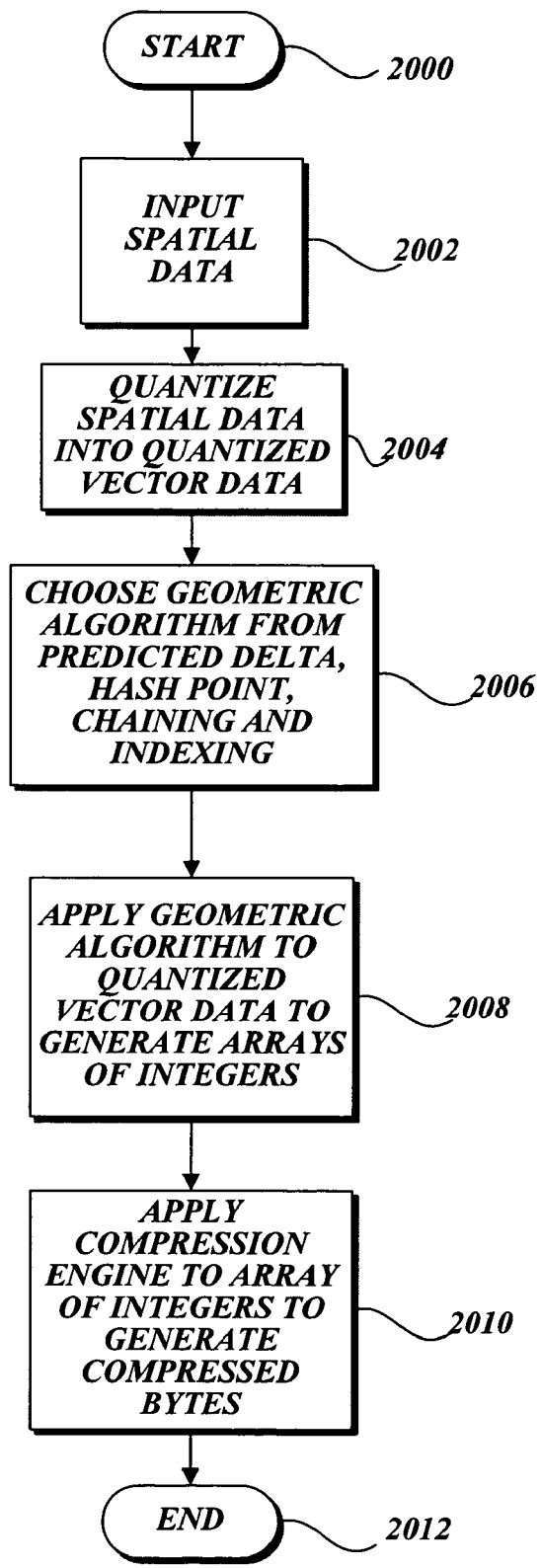
FIG. 20 is a flow diagram of a representative compression routine according to the present invention.

Referring now to FIG. 20, the use of the geometric algorithms described herein, i.e., predictive delta compression, hash point compression, chaining compression, and indexing compression, will be described for use in compressing input data into compressed byte data. In block 2002, spatial data is input. Spatial data may be X, Y pairs of latitude and longitude coordinates for points on a map to represent roads, rivers, and political divisions, for example. In block 2004, the spatial data is quantized into quantized vector data, including true integer values of the X, Y latitude and longitude coordinates. In block 2006, a geometric algorithm from the simple delta, predictive delta, hash point, chaining, and indexing algorithms is selected to apply to the quantized vector data based on the characteristics of the data. (In another embodiment, it is also possible that the data could be stored uncompressed, if the particular data being worked with is unsuitable for any of the other compression algorithms.) For example, predictive delta is suitable for hydrology data, such as rivers; hash point compression is suitable for point information, such as locations of restaurants, museums, gas stations; chaining compression is suitable for interconnected networks, such as streets and highways; and indexing compression is suitable for polygons, such as political divisions. One common mechanism for choosing among the algorithms is simply to try all of them that apply, and pick whichever yields the smallest compressed data size. In block 2008, the selected geometric algorithm is applied to the quantized vector data to generate arrays of integers whose values are closer to zero than the quantized vector data, and also require less storage than the storage required for the quantized vector data. In block 2010, a compression engine, such as the entropy coder, is applied to the arrays of integers to generate compressed bytes. The compresses bytes can be transmitted, stored, or otherwise processed, according to individual grids, and will require less storage than the initial spatial data obtained in block 2002.

Figure 21:
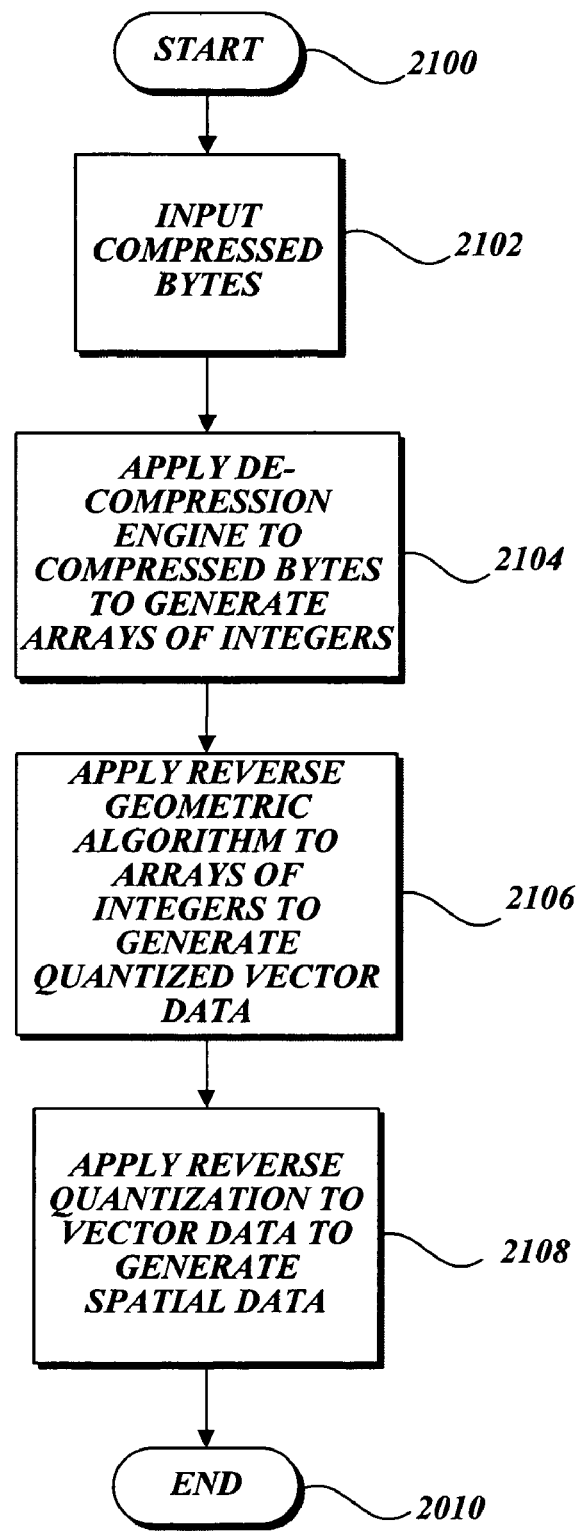
FIG. 21 is a flow diagram of a representative decompression routine according to the present invention.

Referring to FIG. 21, a method for the decompression of compressed bytes into spatial data is illustrated. Such method would be suitably carried out by a cell phone, or other computing device, which has obtained the compressed bytes produced by the method according to FIG. 20.

In block 2102, the compressed bytes generated from the compression method illustrated in FIG. 20 are input into the computing device. The computing device includes a compression engine to generate arrays of integers from the compressed bytes in block 2104. In block 2106, a geometric algorithm selected from simple delta, predictive delta, hash point, chaining, and indexing, is applied in reverse order to the arrays of integers to generate quantized vector data. In another embodiment, it is possible that the data may be stored as uncompressed data obviating the need to apply a geometric algorithm. In block 2108, the quantized vector data is dequantized by applying a quantization process in reverse order to generate the initial spatial data, in block 2108. The spatial data can be represented in graphical format, such as on a display.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for compressing quantized vector data into compressed bytes, the method comprising:
   obtaining the quantized vector data comprising first integers;
   generating a first chain from at least a portion of the quantized vector data;
   generating at least one additional chain that branches from the first chain;
   storing the at least one additional chain as at least one array of second integers, wherein at least a portion of the second integers is closer to zero than the first integers;
   selecting a most suitable algorithm from a plurality of algorithms for compressing the at least one additional chain, wherein selecting the most suitable algorithm for compressing the at least one additional chain comprises:
      subjecting a plurality of algorithms to the at least one additional chain,
      comparing the results of each of the plurality of algorithms subjected to the at least one additional chain, and
      determining the most suitable algorithm for compressing the at least one additional chain;
   compressing, by a computer, the at least one additional array of second integers into the compressed bytes according to the most suitable algorithm; and
   generating a flag indicating which of the plurality of algorithms to be applied at decompression of the compressed bytes.

2. The method of claim 1, wherein the quantized vector data is comprised of vertices of spatial elements.

3. The method of claim 2, wherein the spatial elements comprise at least one polyline.

4. The method of claim 1, wherein the at least one additional chain comprises a starting vertex and an ending vertex.

5. The method of claim 1, wherein the at least one additional chain comprises the following: quantized vertices, true values of at least one quantized vertex of the quantized vertices, simple delta values of at least one quantized vertex of the quantized vertices, and predictive delta values of at least one quantized vertex of the quantized vertices.

6. The method of claim 1, wherein the at least one additional chain is assigned an orientation.

7. The method of claim 1, wherein the at least one additional chain comprises more than one link, and the number of links of the at least one additional chain is stored.

8. The method of claim 1, wherein the quantized vector data is obtained from latitude and longitude coordinates having floating point values, the latitude and longitude coordinates representing a geographical location on a map.

9. The method of claim 8, wherein the latitude and longitude coordinates having floating point values are plotted on a grid and assigned quantized integer values representing an intersection of two lines nearest to the geographical location on a map.

10. A computer storage media including executable instructions which when executed perform a method for compressing quantized vector data into compressed bytes, the method executed by the set of instructions comprising:
   obtaining the quantized vector data comprising first integers;
   generating a first chain from at least a portion of the quantized vector data;
   generating at least one additional chain that branches from the first chain;
   storing the at least one additional chain as at least one array of second integers, wherein at least a portion of the second integers are closer to zero than the first integers;
   selecting an most suitable algorithm of a plurality of algorithms for compressing the at least one additional chain;
   compressing the at least one additional array of second integers into the compressed bytes according to the selected algorithm; and
   generating a flag indicating which of the plurality of algorithms to be applied at decompression of the compressed bytes.

11. The computer storage media of claim 10, wherein the quantized vector data is comprised of vertices of spatial elements.

12. The computer storage media of claim 10, wherein the spatial elements comprise at least one polyline.

13. The computer storage media of claim 10, wherein the at least one additional chain comprises a starting vertex and an ending vertex.

14. The computer storage media of claim 10, wherein the at least one additional chain comprises the following: quantized vertices, true values of at least one quantized vertex of the quantized vertices, simple delta values of at least one quantized vertex of the quantized vertices, and predictive delta values of at least one quantized vertex of the quantized vertices.

15. The computer storage media of claim 10, wherein the at least one additional chain is assigned all orientation.

16. The computer storage media of claim 10, wherein the at least one additional chain comprises more than one link, and the number of links of the at least one chain is stored.

17. The computer storage media of claim 10, wherein the quantized vector data is obtained from latitude and longitude coordinates having floating point values, the latitude and longitude coordinates representing a geographical location on a map.

18. The computer storage media of claim 17, wherein the latitude and longitude coordinates having floating point values are plotted on a grid and assigned quantized integer values representing an intersection of two lines nearest to the geographical location on a map.

19. A system for compressing quantized vector data into compressed bytes, the system comprising:
   a memory storage; and
   a processing unit coupled to the memory storage, wherein the processing unit is operative to:
      obtain the quantized vector data comprising first integers, wherein the quantized vector data is comprised of spatial elements represented as at least one of the following: points, lines, polylines, and polygons, and wherein the spatial elements are plotted on a grid representing a segment of map;
      generate a first chain from at least a portion of the quantized vector data;
      generate at least one additional chain that branches from the first chain;
      store the at least one additional chain as at least one array of second integers, wherein the at least one additional chain comprises the following:
   quantized vertices and true values of at least one quantized vertex of the quantized vertices;
      select a geometric algorithm of a plurality of geometric algorithms for compressing the at least one additional chain;
      compress the at least one additional array of second integers into the compressed bytes according to the geometric algorithm, and
      generate a flag indicating which of the plurality of geometric algorithms to be applied at decompression of the compressed bytes.

20. The system of claim 19, wherein the geometric algorithm for compressing the at least one additional chain is selected by a determination of a most suitable geometric algorithm based on a comparison of results from a plurality of geometric algorithms subjected to the at least one additional chain.

* * * * *